US012715027B2

(12) United States Patent
Polasek et al.

(10) Patent No.: US 12,715,027 B2
(45) **Date of Patent: *Aug. 25, 2026**

(54) HEAT INTEGRATION WITH AQUEOUS HEAT TRANSFER MEDIUM FOR CHEMICAL RECYCLING FACILITIES

(71) Applicant: ExxonMobil Product Solutions Company, Spring, TX (US)

(72) Inventors: Michael Gary Polasek, Longview, TX (US); Daryl Bitting, Longview, TX (US); Xianchun Wu, Longview, TX (US); David Eugene Slivensky, Tatum, TX (US); Avery L. Anderson, Longview, TX (US)

(73) Assignee: ExxonMobil Product Solutions Company, Spring, TX (US)

( * ) Notice: Subject to any disclaimer, the term of this patent is extended or adjusted under 35 U.S.C. 154(b) by 190 days.

This patent is subject to a terminal disclaimer.

(21) Appl. No.: 18/692,913

(22) PCT Filed: Sep. 16, 2022

(86) PCT No.: PCT/US2022/043747

§ 371 (c)(1),
(2) Date: Mar. 18, 2024

(87) PCT Pub. No.: WO2023/049030

PCT Pub. Date: Mar. 30, 2023

(65) Prior Publication Data

US 2024/0424540 A1 Dec. 26, 2024

Related U.S. Application Data

(60) Provisional application No. 63/261,417, filed on Sep. 21, 2021.

(51) Int. Cl.
*B09B 3/40* (2022.01)
*F22B 1/16* (2006.01)
*B09B 101/75* (2022.01)

(52) U.S. Cl.
CPC .................. *B09B 3/40* (2022.01); *F22B 1/16* (2013.01); *B09B 2101/75* (2022.01)

(58) Field of Classification Search
CPC ..... Y02P 20/143; B09B 3/40; B09B 2101/75; F22B 1/16; F23G 5/027; F23G 5/006;
(Continued)

(56) References Cited

U.S. PATENT DOCUMENTS 3,544,291 A 12/1970 Schlinger et al.
4,220,454 A 9/1980 Ban et al.
(Continued)

FOREIGN PATENT DOCUMENTS

CN 203582812 U 5/2014
CN 105238434 B1 3/2017
(Continued)

OTHER PUBLICATIONS

Co-pending U.S. Appl. No. 17/083,592, filed Oct. 29, 2020; Wu et al.

(Continued)

*Primary Examiner* — Vishal V Vasisth
(74) *Attorney, Agent, or Firm* — C. Tumey Law Group PLLC

(57) ABSTRACT

A heat integration process and system for a chemical recycling facility is provided that can lower the carbon footprint and global warming potential of the facility. More particularly, one or more heat transfer media may be used to recover heat energy from a waste plastic pyrolysis effluent and redistribute the recovered heat energy throughout the chemical recycling facility. Thus, the global warming potential of (Continued)

the chemical recycling facility may be optimized and lowered due to the heat integration process and system herein.

20 Claims, 6 Drawing Sheets

(58) Field of Classification Search
CPC ......... F23G 2209/28; C10G 9/40; C10G 1/10; C10G 1/002
See application file for complete search history.

(56) References Cited

U.S. PATENT DOCUMENTS

| | | | |
|---|---|---|---|
| 4,588,850 | A | 5/1986 | Mueller et al. |
| 5,087,763 | A | 2/1992 | Sorensen |
| 5,792,340 | A | 8/1998 | Freel et al. |
| 5,841,011 | A | 11/1998 | Hashimoto et al. |
| 5,904,879 | A | 5/1999 | Winter et al. |
| 7,453,393 | B2 | 11/2008 | Duivenvoorden |
| 7,531,618 | B2 | 5/2009 | DeBruin |
| 8,183,422 | B2 | 5/2012 | Alegria et al. |
| 8,895,790 | B2 | 11/2014 | Narayanaswamy et al. |
| 9,096,801 | B2 | 8/2015 | Baker |
| 10,246,643 | B2 | 4/2019 | Gephart et al. |
| 10,655,070 | B2 | 5/2020 | Wheeler et al. |
| 2006/0251547 | A1 | 11/2006 | Windes et al. |
| 2007/0179326 | A1 | 8/2007 | Baker |
| 2009/0093600 | A1 | 4/2009 | Moore et al. |
| 2014/0228606 | A1 | 8/2014 | Narayanaswamy et al. |
| 2015/0080624 | A1* | 3/2015 | Gephart ................ C10G 19/00 422/200 |
| 2016/0122190 | A1 | 5/2016 | Schmelzer et al. |
| 2016/0264874 | A1 | 9/2016 | Narayanaswamy et al. |
| 2016/0264885 | A1 | 9/2016 | Narayanaswamy et al. |
| 2017/0158503 | A1 | 6/2017 | Foody et al. |
| 2017/0283707 | A1 | 10/2017 | Gephart et al. |
| 2019/0161683 | A1 | 5/2019 | Narayanaswamy et al. |
| 2019/0390124 | A1 | 12/2019 | Oprins et al. |
| 2020/0017772 | A1 | 1/2020 | Ramamurthy et al. |
| 2020/0362248 | A1 | 11/2020 | Cartolano et al. |
| 2021/0130699 | A1 | 5/2021 | Bitting et al. |
| 2021/0130708 | A1 | 5/2021 | Xu et al. |
| 2021/0130710 | A1 | 5/2021 | Xu et al. |
| 2021/0130712 | A1 | 5/2021 | Abudawoud et al. |
| 2021/0130713 | A1 | 5/2021 | Xu et al. |
| 2021/0130714 | A1 | 5/2021 | Abudawoud et al. |
| 2021/0130715 | A1 | 5/2021 | Xu et al. |
| 2021/0130717 | A1 | 5/2021 | Xu et al. |

FOREIGN PATENT DOCUMENTS

| | | | |
|---|---|---|---|
| CN | 112760116 | A | 5/2021 |
| FI | 20 205 131 | A1 | 12/2020 |
| JP | 07-216364 | A | 8/1995 |
| JP | 2000176403 | A | 6/2000 |
| JP | 2000313892 | A | 11/2000 |
| JP | 2018-511671 | A | 4/2018 |
| KR | 10-2000-0023759 | A | 4/2000 |
| WO | WO 2004/018592 | A1 | 3/2004 |
| WO | WO 2010/051013 | A1 | 5/2010 |
| WO | WO 2010/062307 | A1 | 6/2010 |
| WO | WO 2015/100430 | A1 | 7/2015 |
| WO | WO 2016/142809 | A1 | 9/2016 |
| WO | WO 2017/146876 | A1 | 8/2017 |
| WO | WO 2018/005074 | A1 | 1/2018 |
| WO | WO 2018/055555 | A1 | 3/2018 |
| WO | WO 2018/069794 | A1 | 4/2018 |
| WO | WO 2019/056138 | A1 | 3/2019 |
| WO | WO 2020/252228 | A1 | 12/2020 |
| WO | WO 2021/063961 | A1 | 4/2021 |
| WO | WO 2021/084016 | A1 | 5/2021 |
| WO | WO 2021/087038 | A1 | 5/2021 |
| WO | WO 2021/087057 | A1 | 5/2021 |
| WO | WO 2021/163094 | A1 | 8/2021 |
| WO | WO 2021/163113 | A1 | 8/2021 |

OTHER PUBLICATIONS

USPTO Office action dated Feb. 3, 2022 received in co-pending U.S. Appl. No. 17/083,592.

USPTO Office Action dated Sep. 12, 2022 received in co-pending U.S. Appl. No. 17/083,592.

USPTO Offce Action dated Oct. 19, 2023 received in co-pending U.S. Appl. No. 17/083,592.

Co-pending U.S. Appl. No. 17/995,713, filed Oct. 7, 2022; DeBruin et al.

Co-pending U.S. Appl. No. 18/691,476, filed Mar. 13, 2024; Wu et al.

Co-pending U.S. Appl. No. 18/692,880, filed Mar. 18, 2024; Aderson et al.

Co-pending U.S. Appl. No. 18/692,904, filed Mar. 18, 2024; Aderson et al.

Co-pending U.S. Appl. No. 18/691,481, filed Mar. 13, 2024; Slivensky et al.

Co-pending U.S. Appl. No. 18/691,643, filed Mar. 13, 2024; Slivensky et al.

Co-pending U.S. Appl. No. 18/691,596, filed Mar. 13, 2024; Slivensky et al.

Co-pending U.S. Appl. No. 18/691,596, filed Mar. 13, 2024; Wu et al.

Notification of Transmittal of the International Search Report and the Written Opinion of the International Searching Authority with Date of Mailing Jul. 30, 2021 for International Application No. PCT/US2021/027007.

Notification of Transmittal of the International Search Report and the Written Opinion of the International Searching Authority with Date of Mailing Aug. 25, 2022 for International Application No. PCT/US2022/026679.

Notification of Transmittal of the International Search Report and the Written Opinion of the International Searching Authority with Date of Mailing Dec. 9, 2022 for International Application No. PCT/US2022/043746.

Notification of Transmittal of the International Search Report and the Written Opinion of the International Searching Authority with Date of Mailing Dec. 13, 2022 for International Application No. PCT/US2022/043744.

Notification of Transmittal of the International Search Report and the Written Opinion of the International Searching Authority with Date of Mailing Dec. 19, 2022 for International Application No. PCT/US2022/043755.

Notification of Transmittal of the International Search Report and the Written Opinion of the International Searching Authority with Date of Mailing Dec. 28, 2022 for International Application No. PCT/US2022/043749.

Notification of Transmittal of the International Search Report and the Written Opinion of the International Searching Authority with Date of Mailing Dec. 30, 2022 for International Application No. PCT/US2022/043747.

Notification of Transmittal of the International Search Report and the Written Opinion of the International Searching Authority with Date of Mailing Jan. 2, 2023 for International Application No. PCT/US2022/043751.

Notification of Transmittal of the International Search Report and the Written Opinion of the International Searching Authority with Date of Mailing Feb. 24, 2023 for International Application No. PCT/US2022/043753.

Notification of Transmittal of the International Search Report and the Written Opinion of the International Searching Authority with Date of Mailing Feb. 27, 2023 for International Application No. PCT/US2022/043743.

ASTMD2887; "Standard Test Method for Boiling Range Distribution of Petroleum Fractions by Gas Chromatography"; Published Dec. 2023.

ASTMD5399; "Standard Test Method for Boiling Point Distribution of Hydrocarbon Solvents by Gas Chromatography"; Published Aug. 2023.

* cited by examiner

Waste Plastic Source
Plastic Liquification
Pyrolysis
Separation
Cracking Facility
HTM In
HTM Out
10
12
14
16
18
20
22
24
102
104
106
108
112
114
116

HEAT INTEGRATION WITH AQUEOUS HEAT TRANSFER MEDIUM FOR CHEMICAL RECYCLING FACILITIES

CROSS-REFERENCE TO RELATED APPLICATION(S)

This application is a national stage filing under 35 USC § 371 of International Application Number PCT/US2022/043747, filed on, Sep. 16, 2022 which claims the benefit of the filing date to U.S. Provisional Application No. 63/261,417, filed on Sep. 21, 2021, the entire disclosures of which are incorporated by reference herein.

BACKGROUND

Waste plastic pyrolysis plays a part in a variety of chemical recycling technologies. The pyrolysis of waste plastic produces heavy components (e.g., waxes, tar, and char) as well as recycled content pyrolysis oil (r-pyoil) and recycled content pyrolysis gas (r-pygas). When the pyrolysis facility is located near another processing facility, such as a cracker facility, it is desirable to send as much of the r-pyoil and r-pygas as possible to the downstream processing facility to be used as a feedstock in forming other recycled content products (e.g., olefins, paraffins, etc.).

However, when pyrolysis facilities are added to existing downstream facilities, such as a cracking facility, the carbon footprint of the resulting combined facilities is typically not optimized as the primary focus is on the production of specific recycle content products. Consequently, even though recycle content products are being produced by these combined facilities, the environmental impact of the combined facilities may not be thoroughly analyzed so as to avoid releasing more carbon dioxide into the environment than is necessary. Therefore, such combined facilities may exhibit one or more process deficiencies that negatively impact the resulting global warming potential of the combined facilities. Thus, a processing scheme for waste plastic pyrolysis that provides a lower carbon footprint is needed.

SUMMARY

In one aspect, the present technology concerns a chemical recycling process. Generally, the process comprises: (a) pyrolyzing waste plastic in a pyrolysis reactor to thereby provide a pyrolysis effluent; (b) heating an aqueous heat transfer medium (HTM) via indirect heat exchange with at least a portion of the pyrolysis effluent to thereby provide a heated aqueous HTM exhibiting a pressure of at least 700 psi; and (c) heating at least a portion of the waste plastic upstream of the pyrolysis reactor with at least a portion of the heated aqueous HTM via indirect heat exchange.

In one aspect, the present technology concerns a chemical recycling process. Generally, the process comprises: (a) providing a first aqueous heat transfer medium (HTM) and a second aqueous HTM; (b) liquifying waste plastic in a liquification vessel to thereby form a liquefied waste plastic, wherein the liquifying includes heating at least a portion of the waste plastic via indirect heat exchange with a heated second aqueous HTM in the liquification vessel and/or upstream of the liquification vessel; (c) heating at least a portion of the liquefied waste plastic downstream of the liquification vessel via indirect heat exchange with a heated first aqueous HTM to thereby provide a heated liquified waste plastic; (d) pyrolyzing at least a portion of the heated liquefied waste plastic in a pyrolysis reactor to thereby form a pyrolysis effluent; (e) heating at least a portion of the first aqueous HTM with a higher temperature portion of the pyrolysis effluent to thereby form the heated first aqueous HTM, wherein the heated first aqueous HTM has a pressure of at least 700 psi; and (f) heating at least a portion of the second aqueous HTM with a lower temperature portion of the pyrolysis effluent to thereby form the heated second aqueous HTM, wherein the heated second aqueous HTM has a pressure of less than 700 psi.

In one aspect, the present technology concerns a chemical recycling process. Generally, the process comprises: (a) heating a waste plastic in a liquification vessel to thereby form a liquefied waste plastic; (b) pyrolyzing the liquefied waste plastic in a pyrolysis reactor to form a pyrolysis effluent; and (c) supplying heat energy to the waste plastic and/or the liquefied waste plastic via indirect heat exchange with an aqueous HTM, wherein the heat energy supplied by the aqueous HTM is obtained by heat recovery from the pyrolysis effluent.

DETAILED DESCRIPTION

To optimize the carbon footprint of the recycling facility described herein, we have discovered that residual heat energy from the pyrolysis effluent can be efficiently recycled back upstream to the pyrolysis process and waste plastic liquification stage using aqueous heat transfer media. More particularly, we have discovered that one or more aqueous heat transfer media may be used to efficiently recycle heat energy from the pyrolysis effluent back to the pyrolysis process and waste plastic liquification stage. Consequently, by recycling and reutilizing heat energy from the pyrolysis effluent using aqueous heat media, we can lower the carbon footprint and global warming potential of the combined facilities described herein.

Figure 1:
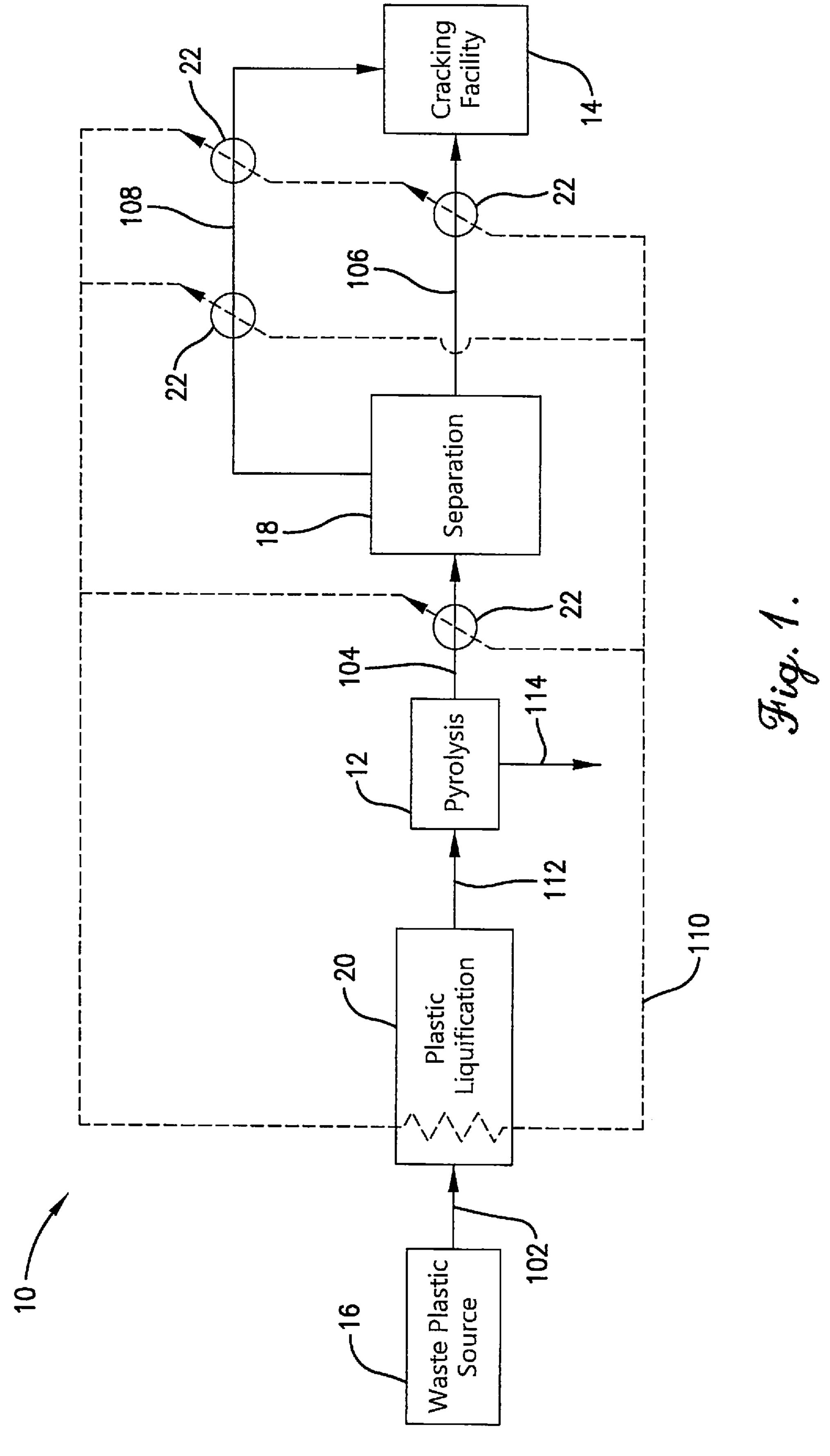
FIG. 1 is a block flow diagram illustrating the main steps of a process and facility for chemically recycling waste plastic and reutilizing heat from the pyrolysis effluent according to embodiments of the present technology.

FIG. 1 depicts an exemplary chemical recycling facility 10 comprising a pyrolysis reactor 12 and a cracking facility 14, along with a waste plastic source 16, a waste plastic liquification zone 20, and a separation zone 18 for separating the pyrolysis effluent 104 into a pyrolysis oil stream 106 and a pyrolysis gas stream 108. As depicted in FIG. 1, a heat transfer medium 110 may be cycled throughout the system so as to distribute heat energy from the pyrolysis effluent, including the pyrolysis gas and/or pyrolysis oil, upstream and/or downstream of the plastic liquification zone 20. It should be understood that FIG. 1 depicts one exemplary embodiment of the present technology. Certain features depicted in FIG. 1 may be omitted and/or additional features described elsewhere herein may be added to the system depicted in FIG. 1. The various process steps, along with the relevant heat transfer media, are described below in greater detail.

Overall Chemical Recycling Facility

Turning now to FIG. 1, the main steps of a process for chemically recycling waste plastic in a chemical recycling facility 10 are shown. Chemical recycling processes and facilities as described herein may be used to convert waste plastic to recycle content products or chemical intermediates used to form a variety of end use materials. The waste plastic fed to the chemical recycling facility/process can be mixed plastic waste (MPW), pre-sorted waste plastic, and/or pre-processed waste plastic. As shown in FIG. 1, the waste plastic feed stream 102 may be derived from the waste plastic source 16, which may include a waste plastic pre-processing facility.

In an embodiment or in combination with any embodiment mentioned herein, the chemical recycling facility 10 may be a commercial-scale facility capable of processing significant volumes of mixed plastic waste. As used herein, the term "commercial scale facility" refers to a facility having an average annual feed rate of at least 500 pounds per hour, averaged over one year.

In an embodiment or in combination with any embodiment mentioned herein, two or more of the facilities shown in FIG. 1, such as the pyrolysis facility, including the pyrolysis reactor 12, the plastic liquification zone 20, and the separation zone 18, and the cracking facility 14 may also be co-located with one another. As used herein, the term "co-located" refers to facilities in which at least a portion of the process streams and/or supporting equipment or services are shared between the two facilities. When two or more of the facilities shown in FIG. 1 are co-located, the facilities may meet at least one of the following criteria (i) through (v): (i) the facilities share at least one non-residential utility service; (ii) the facilities share at least one service group; (iii) the facilities are owned and/or operated by parties that share at least one property boundary; (iv) the facilities are connected by at least one conduit configured to carry at least one process material (e.g., solid, liquid and/or gas fed to, used by, or generated in a facility) from one facility to another; and (v) the facilities are within 40, within 35, within 30, within 20, within 15, within 12, within 10, within 8, within 5, within 2, or within 1 mile of one another, measured from their geographical center. At least one, at least two, at least three, at least four, or all of the above statements (i) through (v) may be true.

Regarding (i), examples of suitable utility services include, but are not limited to, steam systems (co-generation and distribution systems), cooling water systems, heat transfer fluid systems, plant or instrument air systems, nitrogen systems, hydrogen systems, non-residential electrical generation and distribution, including distribution above 8000V, non-residential wastewater/sewer systems, storage facilities, transport lines, flare systems, and combinations thereof.

Regarding (ii), examples of service groups and facilities include, but are not limited to, emergency services personnel (fire and/or medical), a third-party vendor, a state or local government oversight group, and combinations thereof. Government oversight groups can include, for example, regulatory or environmental agencies, as well as municipal and taxation agencies at the city, county, and state level.

Regarding (iii), the boundary may be, for example, a fence line, a property line, a gate, or common boundaries with at least one boundary of a third-party owned land or facility.

Regarding (iv), the conduit may be a fluid conduit that carries a gas, a liquid, a solid/liquid mixture (e.g., slurry), a solid/gas mixture (e.g., pneumatic conveyance), a solid/liquid/gas mixture, or a solid (e.g., belt conveyance). In some cases, two units may share one or more conduits selected from the above list.

Turning again to FIG. 1, a stream 102 of waste plastic, which can be mixed plastic waste (MPW), may be introduced into the chemical recycling facility 10 from the waste plastic source 16. As used herein, the terms "waste plastic" and "plastic waste" refer to used, scrap, and/or discarded plastic materials, such as plastic materials typically sent to a landfill. The waste plastic stream 102 fed to the chemical recycling facility 10 may include unprocessed or partially processed waste plastic. As used herein, the term "unprocessed waste plastic" means waste plastic that has not be subjected to any automated or mechanized sorting, washing, or comminuting. Examples of unprocessed waste plastic include waste plastic collected from household curbside plastic recycling bins or shared community plastic recycling containers. Partially processed waste plastics may originate from, for example, municipal recycling facilities (MRFs) or reclaimers. In certain embodiments, the waste plastic may comprise at least one of post-industrial (or pre-consumer) plastic and/or post-consumer plastic.

In an embodiment or in combination with any embodiment mentioned herein, the mixed waste plastic (MPW) includes at least two distinct types of plastic.

In an embodiment or in combination with any embodiment mentioned herein, all or a portion of the MPW in the waste plastic stream 102 can originate from a municipal recycling facility (MRF).

In an embodiment or in combination with any embodiment mentioned herein, all or a portion of the MPW in the waste plastic stream 102 can originate from a reclaimer facility.

Examples of suitable waste plastics can include, but are not limited to, polyolefins (PO), aromatic and aliphatic polyesters, polyvinyl chloride (PVC), polystyrene, cellulose esters, polytetrafluoroethylene, acrylobutadienestyrene (ABS), cellulosics, epoxides, polyamides, phenolic resins, polyacetal, polycarbonates, polyphenylene-based alloys, poly(methyl methacrylate), styrene-containing polymers, polyurethane, vinyl-based polymers, styrene acrylonitrile, and urea-containing polymers and melamines.

Examples of specific polyolefins may include linear low-density polyethylene (LLDPE), low density polyethylene (LDPE), polymethylpentene, polybutene-1, high density polyethylene (HDPE), atactic polypropylene, isotactic polypropylene, syndiotactic polypropylene, crosslinked polyethylene, amorphous polyolefins, and the copolymers of any one of the aforementioned polyolefins.

Examples of polyesters can include those having repeating aromatic or cyclic units such as those containing a repeating terephthalate, isophthalate, or naphthalate units such as PET, modified PET, and PEN, or those containing repeating furanoate repeating units. As used herein, "PET" or "polyethylene terephthalate" refers to a homopolymer of polyethylene terephthalate, or to a polyethylene terephthalate modified with one or more acid and/or glycol modifiers and/or containing residues or moieties of other than ethylene glycol and terephthalic acid, such as isophthalic acid, 1,4-cyclohexanedicarboxylic acid, diethylene glycol, 2,2,4,4-tetramethyl-1,3-cyclobutanediol (TMCD), cyclohexanedimethanol (CHDM), propylene glycol, isosorbide, 1,4-butanediol, 1,3-propane diol, and/or neopentyl glycol (NPG).

In an embodiment or in combination with any embodiment mentioned herein, the waste plastic stream 102 comprises at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of one or more polyolefins, based on the total weight of the stream. Alternatively, or in addition, the waste plastic stream 102 comprises not more than 99.9, not more than 99, not more than 97, not more than 92, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, or not more than 5 weight percent of one or more polyolefins, based on the total weight of the stream.

In one embodiment or in combination with any of the mentioned embodiments, the waste plastic stream 102 comprises not more than 20, not more than 15, not more than 12, not more than 10, not more than 8, not more than 6, not more than 5, not more than 4, not more than 3, not more than 2, or not more than 1 weight percent of polyesters, based on the total weight of the stream.

In one embodiment or in combination with any of the mentioned embodiments, the waste plastic stream 102 comprises not more than 20, not more than 15, not more than 12, not more than 10, not more than 8, not more than 6, not more than 5, not more than 4, not more than 3, not more than 2, or not more than 1 weight percent of biowaste materials, based on the total weight of the stream. As used herein, the term "biowaste" refers to material derived from living organisms or of organic origin. Exemplary biowaste materials include, but are not limited to, cotton, wood, saw dust, food scraps, animals and animal parts, plants and plant parts, and manure.

In an embodiment or in combination with any embodiment mentioned herein, the waste plastic stream 102 can include not more than 10, not more than 5, not more than 4, not more than 3, not more than 2, not more than 1, not more than 0.75, or not more than 0.5 weight percent of polyvinyl chloride (PVC), based on the total weight of the stream.

The general configuration and operation of each of the facilities that may be present in the chemical recycling facility shown in FIG. 1 will now be described in further detail below, beginning with the optional preprocessing facility of the waste plastic source 16.

Optional Plastic Preprocessing

As shown in FIG. 1, unprocessed, partially processed, and/or processed waste plastic, such as mixed plastic waste (MPW), may first be introduced into the chemical recycling facility 10 via the waste plastic stream 102 from the waste plastic source 16. As noted above, the waste plastic source 16 may include an optional preprocessing facility that can prepare the waste plastic feedstock for the downstream recycling processes. While in the optional preprocessing facility, the waste plastic feedstock may undergo one or more preprocessing steps to prepare it for chemical recycling. As used herein, the term "preprocessing facility" refers to a facility that includes all equipment, lines, and controls necessary to carry out the preprocessing of waste plastic. Preprocessing facilities as described herein may employ any suitable method for carrying out the preparation of waste plastic for chemical recycling using one or more of following steps, which are described in further detail below. Alternatively, in certain embodiments, the waste plastic source 16 does not contain a preprocessing facility and the waste plastic stream 102 is not subjected to any preprocessing before any of the downstream chemical recycling steps described herein.

In an embodiment or in combination with any embodiment mentioned herein, the preprocessing facility of the waste plastic source 16 may include at least one separation step or zone. The separation step or zone may be configured to separate the waste plastic stream into two or more streams enriched in certain types of plastics. Such separation is particularly advantageous when the waste plastic fed to the chemical recycling facility 10 is MWP.

Any suitable type of separation device, system, or facility may be employed to separate the waste plastic into two or more streams enriched in certain types of plastics such as, for example, a PET-enriched stream and a PO-enriched stream. Examples of suitable types of separation include mechanical separation and density separation, which may include sink-float separation and/or centrifugal density separation. As used herein, the term "sink-float separation" refers to a density separation process where the separation of materials is primarily caused by floating or sinking in a selected liquid medium, while the term "centrifugal density separation" refers to a density separation process where the separation of materials is primarily caused by centrifugal forces.

Referring again to FIG. 1, the waste plastic stream 102 may be introduced into one or more downstream processing facilities (or undergo one or more downstream processing steps) within the chemical recycling facility 10. In an embodiment or in combination with any embodiment mentioned herein, at least a portion of the waste plastic stream 102 may be directly or indirectly introduced into the plastic liquification zone 20. Additional details of each step, as well as the general integration of each of these steps or facilities with one or more of the others according to one or more embodiments of the present technology are discussed in further detail below.

Liquification/Dehalogenation

As shown in FIG. 1, the waste plastic stream 102 may be introduced into a plastic liquification zone 20 prior to being introduced into one or more of the downstream processing facilities. As used herein, the term "liquification" zone refers to a chemical processing zone or step in which at least a portion of the incoming plastic is liquefied. The step of liquefying plastic can include chemical liquification, physical liquification, or combinations thereof. Exemplary methods of liquefying the plastic introduced in the liquification zone 20 can include: (i) heating/melting; (ii) dissolving in a solvent; (iii) depolymerizing; (iv) plasticizing; and combinations thereof. Additionally, one or more of options (i) through (iv) may also be accompanied by the addition of a blending or liquification agent to help facilitate the liquification (reduction of viscosity) of the polymer material. As such, a variety of rheology modification agents (e.g., solvents, depolymerization agents, plasticizers, and blending agents) can be used the enhance the flow and/or dispersibility of the liquified waste plastic.

When added to the liquification zone 20, at least 50, at least 55, at least 60, at least 65, at least 70, at least 75, at least 80, at least 85, at least 90, at least 95, or at least 99 weight percent of the plastic (usually waste plastic) originally present in the waste plastic stream 102 undergoes a reduction in viscosity. In some cases, the reduction in viscosity can be facilitated by heating (e.g., addition of steam directly or indirectly contacting the plastic), while, in other cases, it can be facilitated by combining the plastic with a solvent capable of dissolving it. Examples of suitable solvents can include, but are not limited to, alcohols such as methanol or ethanol, glycols such as ethylene glycol, diethylene glycol, triethylene glycol, neopentyl glycol, cyclohexanedimethanol, glycerin, pyrolysis oil, motor oil, and water. This dissolution solvent can be added directly to the liquification vessel in the liquification zone 20, or it can be previously combined with one or more streams fed to the liquification zone 20, including the waste plastic stream 102.

In an embodiment or in combination with any embodiment mentioned herein, the dissolution solvent can comprise a stream withdrawn from one or more other facilities within the chemical recycling facility. For example, the solvent can comprise a stream withdrawn from the pyrolysis reactor 12 and/or the separation zone 18. In certain embodiments, the dissolution solvent can be or comprise pyrolysis oil.

In some cases, the waste plastic can be depolymerized such that, for example, the number average chain length of the plastic is reduced by contact with a depolymerization agent. In an embodiment or in combination with any embodiment mentioned herein, at least one of the previously-listed solvents may be used as a depolymerization agent, while, in one or more other embodiments, the depolymerization agent can include an organic acid (e.g., acetic acid, citric acid, butyric acid, formic acid, lactic acid, oleic acid, oxalic, stearic acid, tartaric acid, and/or uric acid) or inorganic acid such as sulfuric acid (for polyolefins). The depolymerization agent may reduce the melting point and/or viscosity of the polymer by reducing its number average chain length.

Alternatively, or additionally, a plasticizer can be used in the liquification zone 20 to reduce the viscosity of the plastic. Plasticizers for polyethylene include, for example, dioctyl phthalate, dioctyl terephthalate, glyceryl tribenzoate, polyethylene glycol having molecular weight of up to 8,000 Daltons, sunflower oil, paraffin wax having molecular weight from 400 to 1,000 Daltons, paraffinic oil, mineral oil, glycerin, EPDM, and EVA. Plasticizers for polypropylene include, for example, dioctyl sebacate, paraffinic oil, isooctyl tallate, plasticizing oil (Drakeol 34), naphthenic and aromatic processing oils, and glycerin. Plasticizers for polyesters include, for example, polyalkylene ethers (e.g., polyethylene glycol, polytetramethylene glycol, polypropylene glycol or their mixtures) having molecular weight in the range from 400 to 1500 Daltons, glyceryl monostearate, octyl epoxy soyate, epoxidized soybean oil, epoxy tallate, epoxidized linseed oil, polyhydroxyalkanoate, glycols (e.g., ethylene glycol, pentamethylene glycol, hexamethylene glycol, etc.), phthalates, terephthalates, trimellitate, and polyethylene glycol di-(2-ethylhexonate). When used, the plasticizer may be present in an amount of at least 0.1, at least 0.5, at least 1, at least 2, or at least 5 weight percent and/or not more than 10, not more than 8, not more than 5, not more than 3, not more than 2, or not more than 1 weight percent, based on the total weight of the waste plastic stream 102, or it can be in a range of from 0.1 to 10 weight percent, 0.5 to 8 weight percent, or 1 to 5 weight percent, based on the total weight of the waste plastic stream 102.

Further, one or more of the methods of liquifying the waste plastic stream 102 can also include adding at least one blending agent to the plastic stream before, during, or after the liquification process in the liquification zone 20. Such blending agents may include for example, emulsifiers and/or surfactants, and may serve to more fully blend the liquified plastic into a single phase, particularly when differences in densities between the plastic components of a mixed plastic stream result in multiple liquid or semi-liquid phases. When used, the blending agent may be present in an amount of at least 0.1, at least 0.5, at least 1, at least 2, or at least 5 weight percent and/or not more than 10, not more than 8, not more than 5, not more than 3, not more than 2, or not more than 1 weight percent, based on the total weight of the waste plastic stream 102, or it can be in a range of from 0.1 to 10 weight percent, 0.5 to 8 weight percent, or 1 to 5 weight percent, based on the total weight of the waste plastic stream 102.

In an embodiment or in combination with any embodiment mentioned herein, a portion of the pyrolysis oil stream 106 withdrawn from the separation zone 18 can be combined with the waste plastic stream 102 to form a liquified plastic. Generally, in such embodiments, all or a portion of the pyrolysis oil stream 106 may be combined with the waste plastic stream 102 prior to introduction into the liquification zone 20, or after the waste plastic stream 102 enters the liquification vessel within the liquification zone 20.

In an embodiment or in combination with any embodiment mentioned herein, the liquified (or reduced viscosity) plastic stream 112 withdrawn from the liquification zone 20 can include at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent and/or not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of one or more polyolefins, based on the total weight of the stream, or the amount of polyolefins can be in the range of from 1 to 99 weight percent, 5 to 90 weight percent, or 10 to 85 weight percent, based on the total weight of the stream.

In an embodiment or in combination with any embodiment mentioned herein, the liquified plastic stream 112 exiting the liquification zone 20 can have a viscosity of less than 3,000, less than 2,500, less than 2,000, less than 1,500, less than 1,000, less than 800, less than 750, less than 700, less than 650, less than 600, less than 550, less than 500, less than 450, less than 400, less than 350, less than 300, less than 250, less than 150, less than 100, less than 75, less than 50, less than 25, less than 10, less than 5, or less than 1 poise, as measured using a Brookfield R/S rheometer with a V80-40 vane spindle operating at a shear rate of 10 rad/s and a temperature of 350° C.

In an embodiment or in combination with any embodiment mentioned herein, the viscosity (measured at 350° C. and 10 rad/s and expressed in poise) of the liquified plastic stream 112 exiting the liquification zone is not more than 95, not more than 90, not more than 75, not more than 50, not more than 25, not more than 10, not more than 5, or not more than 1 percent of the viscosity of the waste plastic stream 102 introduced into the liquification zone 20.

In an embodiment or in combination with any embodiment mentioned herein, the liquification zone 20 may comprise a liquification vessel, such as a melt tank and/or an extruder, to facilitate the plastic liquification. Additionally, in certain embodiments, the liquification zone 20 may also contain at least one stripping column and at least one disengagement vessel to facilitate the removal of halogenated compounds that may be formed in the melt tank and/or the extruder.

In an embodiment or in combination with any embodiment mentioned herein, the liquification vessel (e.g., the melt tank and/or the extruder) may receive the waste plastic feed stream 102 and heat the waste plastic via heating mechanisms in the melt tank and/or via the extrusion process in the extruder.

In an embodiment or in combination with any embodiment mentioned herein, the melt tank can include one or more continuously stirred tanks. When one or more rheology modification agents (e.g., solvents, depolymerization agents, plasticizers, and blending agents) are used in the liquification zone 20, such rheology modification agents can be added to and/or mixed with the waste plastic stream 102 in or prior to introduction into the melt tank.

In an embodiment or in combination with any embodiment mentioned herein, the interior space of the liquification vessel, where the plastic is heated, is maintained at a temperature of at least 200, at least 210, at least 220, at least 230, at least 240, at least 250, at least 260, at least 270, at least 280, at least 290, at least 300, at least 310, at least 320, at least 330, at least 340, at least 350, at least 360, at least 370, at least 380, at least 390, or at least 400° C. Additionally, or in the alternative, the interior space of the liquification vessel may be maintained at a temperature of not more than 500, not more than 475, not more than 450, not more than 425, not more than 400, not more than 390, not more than 380, not more than 370, not more than 365, not more than 360, not more than 355, not more than 350, or not more than 345° C. Generally, in one or more embodiments, the interior space of the liquification vessel may be maintained at a temperature ranging from 200 to 500° C., 240 to 425° C., 280 to 380° C., or 320 to 350° C.

In an embodiment or in combination with any embodiment mentioned herein, the plastic fed into the liquification vessel may have a residence time in the liquification vessel of at least 1, at least 5, at least 10, at least 20, at least 30, at least 40, at least 50, or at least 60 minutes and/or not more than 10, not more than 9, not more than 8, not more than 7, not more than 6, not more than 5, not more than 4, or not more than 3 hours. Generally, in one or more embodiments, the plastic fed into the liquification vessel may have a residence time in the liquification vessel in the range of 1 minute to 10 hours, 30 minutes to 6 hours, or 60 minutes to 4 hours.

In an embodiment or in combination with any embodiment mentioned herein, the pressure within the liquification vessel may be maintained at a range from an absolute vacuum to 100 torr.

In an embodiment or in combination with any embodiment mentioned herein, the liquification zone 20 may optionally contain equipment for removing halogens from the waste plastic stream 102. When the waste plastic is heated in the liquification zone 20, halogen enriched gases can evolve. By disengaging the evolved halogen-enriched gasses from the liquified plastics, the concentration of halogens in the liquified plastic stream 112 can be reduced.

In an embodiment or in combination with any embodiment mentioned herein, dehalogenation can be promoted by sparging a stripping gas (e.g., steam) into the liquified plastics in the melt tank.

In an embodiment or in combination with any embodiment mentioned herein, the liquified plastic stream 112 exiting the liquification zone 20 can have a halogen content of less than 500, less than 400, less than 300, less than 200, less than 100, less than 50, less than 10, less than 5, less than 2, less than 1, less than 0.5, or less than 0.1 ppmw.

In an embodiment or in combination with any embodiment mentioned herein, the halogen content of the liquified plastic stream 112 exiting the liquification zone 20 can be not more than 95, not more than 90, not more than 75, not more than 50, not more than 25, not more than 10, or not more than 5 percent by weight of the halogen content of the waste plastic stream 102 introduced into the liquification zone 20.

As shown in FIG. 1 and described below in greater detail, at least a portion of the liquified plastic stream 112 may be introduced into a downstream pyrolysis reactor 12 at a pyrolysis facility to produce a pyrolysis effluent, including pyrolysis oil and pyrolysis gas.

Pyrolysis

As shown in FIG. 1, the chemical recycling facility 10 may comprise a pyrolysis facility, including a pyrolysis reactor 12. As used herein the term "pyrolysis" refers to the thermal decomposition of one or more organic materials at elevated temperatures in an inert (i.e., substantially oxygen free) atmosphere. A "pyrolysis facility" is a facility that includes all equipment, lines, and controls necessary to carry out pyrolysis of waste plastic and feedstocks derived therefrom. In certain embodiments, the pyrolysis facility can comprise the pyrolysis reactor 12 and, optionally, the plastic liquification zone 20 and/or the separation zone 18.

As depicted in FIG. 1, the liquified plastic stream 112 may be introduced into a downstream pyrolysis reactor 12 at a pyrolysis facility so as to produce a pyrolysis effluent stream 104 and an optional pyrolysis residue stream 114.

In an embodiment or in combination with any embodiment mentioned herein the liquified plastic stream 112 to the pyrolysis facility 12 may be a PO-enriched stream of waste plastic. The liquified plastic stream 112 introduced into the pyrolysis reactor 12 can be in the form of liquified plastic (e.g., liquified, melted, plasticized, depolymerized, or combinations thereof), plastic pellets or particulates, or a slurry thereof.

In general, the pyrolysis facility may include the plastic liquification zone 20, the pyrolysis reactor 12, and the separation zone 18 for separating the pyrolysis effluent 104 from the reactor.

While in the pyrolysis reactor 12, at least a portion of the feed may be subjected to a pyrolysis reaction that produces a pyrolysis effluent comprising a pyrolysis oil, a pyrolysis gas, and a pyrolysis residue. Generally, the pyrolysis effluent stream 104 exiting the pyrolysis reactor 12 can be in the form of pyrolysis vapors that comprise the pyrolysis gas and uncondensed pyrolysis oil. As used herein, "pyrolysis vapor" refers to the uncondensed pyrolysis effluent that comprises the majority of the pyrolysis oil and the pyrolysis gas present in the pyrolysis effluent.

Pyrolysis is a process that involves the chemical and thermal decomposition of the introduced feed. Although all pyrolysis processes may be generally characterized by a reaction environment that is substantially free of oxygen, pyrolysis processes may be further defined, for example, by the pyrolysis reaction temperature within the reactor, the residence time in the pyrolysis reactor, the reactor type, the pressure within the pyrolysis reactor, and the presence or absence of pyrolysis catalysts.

In an embodiment or in combination with any embodiment mentioned herein, the pyrolysis reactor 12 can be, for example, a film reactor, a screw extruder, a tubular reactor, a tank, a stirred tank reactor, a riser reactor, a fixed bed reactor, a fluidized bed reactor, a rotary kiln, a vacuum reactor, a microwave reactor, or an autoclave. In various embodiments, the pyrolysis reactor 12 may comprise a film reactor, such as a falling film reactor or an up-flow film reactor.

In an embodiment or in combination with any embodiment mentioned herein, a lift gas and/or a feed gas may be used to introduce the feedstock into the pyrolysis reactor 12 and/or facilitate various reactions within the pyrolysis reactor 12. For instance, the lift gas and/or the feed gas may comprise, consist essentially of, or consist of nitrogen, carbon dioxide, and/or steam. The lift gas and/or feed gas may be added with the waste plastic stream 112 prior to introduction into the pyrolysis reactor 12 and/or may be added directly to the pyrolysis reactor 12. The lift gas and/or feed gas can include steam and/or a reducing gas such as hydrogen, carbon monoxide, and combinations thereof.

Furthermore, the temperature in the pyrolysis reactor 12 can be adjusted so as to facilitate the production of certain end products. In an embodiment or in combination with any embodiment mentioned herein, the pyrolysis temperature in the pyrolysis reactor 12 can range from 325 to 1,100° C., 350 to 900° C., 350 to 700° C., 350 to 550° C., 350 to 475° C., 425 to 1,100° C., 425 to 800° C., 500 to 1,100° C., 500 to 800° C., 600 to 1,100° C., 600 to 800° C., 650 to 1,000° C., or 650 to 800° C.

In an embodiment or in combination with any embodiment mentioned herein, the residence times of the feedstocks within the pyrolysis reactor 12 can be at least 0.1, at least 0.2, at least 0.3, at least 0.5, at least 1, at least 1.2, at least 1.3, at least 2, at least 3, or at least 4 seconds. Alternatively, the residence times of the feedstocks within the pyrolysis reactor 12 can be at least 1, at least 2, at least 3, at least 4, at least 5, at least 6, at least 7, at least 8, at least 9, at least 10, at least 20, at least 30, at least 45, at least 60, at least 75, or at least 90 minutes. Additionally, or alternatively, the residence times of the feedstocks within the pyrolysis reactor 12 can be less than 6, less than 5, less than 4, less than 3, less than 2, less than 1, or less than 0.5 hours. Furthermore, the residence times of the feedstocks within the pyrolysis reactor 12 can be less than 100, less than 90, less than 80, less than 70, less than 60, less than 50, less than 40, less than 30, less than 20, less than 10, less than 9, less than 8, less than 7, less than 6, less than 5, less than 4, less than 3, less than 2, or less than 1 seconds. More particularly, the residence times of the feedstocks within the pyrolysis reactor 12 can range from 0.1 to 10 seconds, 0.5 to 10 seconds, 30 minutes to 4 hours, or 30 minutes to 3 hours, or 1 hour to 3 hours, or 1 hour to 2 hours.

In an embodiment or in combination with any embodiment mentioned herein, the pressure within the pyrolysis reactor 12 can be maintained at atmospheric pressure or within the range of 0.1 to 100 bar, or 0.1 to 60 bar, or 0.1 to 30 bar, or 0.1 to 10 bar, 0.2 to 1.5 bar, or 0.3 to 1.1 bar. As used herein, the term "bar" refers to gauge pressure, unless otherwise noted.

In an embodiment or in combination with any embodiment mentioned herein, a pyrolysis catalyst may be introduced into the liquified plastic stream 112 prior to introduction into the pyrolysis reactor 12 and/or introduced directly into the pyrolysis reactor 12. The catalyst can be homogenous or heterogeneous and may include, for example, certain types of zeolites and other mesostructured catalysts. In some embodiments, the pyrolysis reaction may not be catalyzed (e.g., carried out in the absence of a pyrolysis catalyst), but may include a non-catalytic, heat-retaining inert additive, such as sand, in the reactor in order to facilitate the heat transfer. Such catalyst-free pyrolysis processes may be referred to as "thermal pyrolysis."

In one embodiment or in combination with one or more embodiments disclosed herein, the pyrolysis reaction performed in the pyrolysis reactor 12 can be carried out at a temperature of less than 700, less than 650, or less than 600° C. and at least 300, at least 350, or at least 400° C. The feed to the pyrolysis reactor 12 can comprise, consists essentially of, or consists of waste plastic. The feed stream, and/or the waste plastic component of the feed stream, can have a number average molecular weight (Mn) of at least 3000, at least 4000, at least 5000, or at least 6000 g/mole. If the feed to the pyrolysis reactor 12 contains a mixture of components, the Mn of the pyrolysis feed is the weighted average Mn of all feed components, based on the mass of the individual feed components. The waste plastic in the feed to the pyrolysis reactor 12 can include post-consumer waste plastic, post-industrial waste plastic, or combinations thereof.

In certain embodiments, the feed to the pyrolysis reactor 12 comprises less than 5, less than 2, less than 1, less than 0.5, or about 0.0 weight percent coal and/or biomass (e.g., lignocellulosic waste, switchgrass, fats and oils derived from animals, fats and oils derived from plants, etc.), based on the weight of solids in pyrolysis feed or based on the weight of the entire pyrolysis feed. The feed to the pyrolysis reaction can also comprise less than 5, less than 2, less than 1, or less than 0.5, or about 0.0 weight percent of a co-feed stream, including steam, sulfur-containing co-feed streams, and/or non-plastic hydrocarbons (e.g., non-plastic hydrocarbons having less than 50, less than 30, or less than 20 carbon atoms), based on the weight of the entire pyrolysis feed other than water or based on the weight of the entire pyrolysis feed.

Additionally, or alternatively, the pyrolysis reactor may comprise a film reactor, a screw extruder, a tubular reactor, a stirred tank reactor, a riser reactor, a fixed bed reactor, a fluidized bed reactor, a rotary kiln, a vacuum reactor, a microwave reactor, or an autoclave. The reactor may also utilize a feed gas and/or lift gas for facilitating the introduction of the feed into the pyrolysis reactor. The feed gas and/or lift gas can comprise nitrogen and can comprise less than 5, less than 2, less than 1, or less than 0.5, or about 0.0 weight percent of steam and/or sulfur-containing compounds.

After exiting the pyrolysis reactor 12, the pyrolysis effluent 104 may be separated into the pyrolysis oil stream 106 and the pyrolysis gas stream 108 in the separation zone 18. Although not depicted in FIG. 1, the separation zone 18 can include various types of equipment including, but not limited to a filter system, a multistage separator, a condenser, and/or a quench tower. While the in the separation zone 18, the pyrolysis effluent 104, such as the pyrolysis vapors, may be cooled so as to condense the pyrolysis oil fraction originally present in the pyrolysis effluent stream 104.

In an embodiment or in combination with any embodiment mentioned herein, the pyrolysis effluent or pyrolysis vapors may comprise at least 1, at least 5, at least 10, at least 15, at least 20, at least 25, at least 30, at least 35, at least 40, at least 45, at least 50, at least 55, at least 60, at least 65, at least 70, or at least 75 weight percent of the pyrolysis oil, based on the total weight of the pyrolysis effluent or pyrolysis vapors. Additionally, or alternatively, the pyrolysis effluent or pyrolysis vapors may comprise not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, or not more than 25 weight percent of the pyrolysis oil, based on the total weight of the pyrolysis effluent or pyrolysis vapors. As discussed above, the pyrolysis oil may be in the form of uncondensed vapors in the pyrolysis effluent upon exiting the heated reactor 12; however, these vapors may be subsequently condensed into the resulting pyrolysis oil. The pyrolysis effluent or pyrolysis vapors may comprise in the range of 20 to 99 weight percent, 25 to 80 weight percent, 30 to 85 weight percent, 30 to 80 weight percent, 30 to 75 weight percent, 30 to 70 weight percent, or 30 to 65 weight percent of the pyrolysis oil, based on the total weight of the pyrolysis effluent or pyrolysis vapors.

In an embodiment or in combination with any embodiment mentioned herein, the pyrolysis effluent or pyrolysis vapors may comprise at least 1, at least 5, at least 10, at least 15, at least 20, at least 25, at least 30, at least 35, at least 40, at least 45, at least 50, at least 55, at least 60, at least 65, at least 70, at least 75, or at least 80 weight percent of the pyrolysis gas, based on the total weight of the pyrolysis effluent or pyrolysis vapors. Additionally, or alternatively, the pyrolysis effluent or pyrolysis vapors may comprise not more than 99, not more than 95, not more than 90, not more than 85, not more than 80, not more than 75, not more than 70, not more than 65, not more than 60, not more than 55, not more than 50, or not more than 45 weight percent of the pyrolysis gas, based on the total weight of the pyrolysis effluent or pyrolysis vapors. The pyrolysis effluent may comprise 1 to 90 weight percent, 10 to 85 weight percent, 15 to 85 weight percent, 20 to 80 weight percent, 25 to 80 weight percent, 30 to 75 weight percent, or 35 to 75 weight percent of the pyrolysis gas, based on the total weight of the stream.

In an embodiment or in combination with any embodiment mentioned herein, the pyrolysis effluent or pyrolysis vapors may comprise at least 0.5, at least 1, at least 2, at least 3, at least 4, at least 5, at least 6, at least 7, at least 8, at least 9, or at least 10 weight percent of the pyrolysis residue, based on the total weight of the pyrolysis effluent or pyrolysis vapors. Additionally, or alternatively, the pyrolysis effluent may comprise not more than 60, not more than 50, not more than 40, not more than 30, not more than 25, not more than 20, not more than 15, not more than 10, not more than 9, not more than 8, not more than 7, not more than 6, or not more than 5 weight percent of the pyrolysis residue, based on the total weight of the pyrolysis effluent or pyrolysis vapors. The pyrolysis effluent may comprise in the range of 0.1 to 25 weight percent, 1 to 15 weight percent, 1 to 8 weight percent, or 1 to 5 weight percent of the pyrolysis residue, based on the total weight of the pyrolysis effluent or pyrolysis vapors.

The resulting pyrolysis oil stream 106 and pyrolysis gas stream 108 may be directly used in various downstream applications based on their formulations. The various characteristics and properties of the pyrolysis oil, pyrolysis gas, and pyrolysis residue are described below. It should be noted that, while all of the following characteristics and properties may be listed separately, it is envisioned that each of the following characteristics and/or properties of the pyrolysis gas, pyrolysis oil, and/or pyrolysis residue are not mutually exclusive and may be combined and present in any combination.

In an embodiment or in combination with any embodiment mentioned herein, the pyrolysis oil may predominantly comprise hydrocarbons having from 4 to 30 carbon atoms per molecule (e.g., C4 to C30 hydrocarbons). As used herein, the term "Cx" or "Cx hydrocarbon," refers to a hydrocarbon compound including "x" total carbons per molecule, and encompasses all olefins, paraffins, aromatics, heterocyclic, and isomers having that number of carbon atoms. For example, each of normal, iso, and tert-butane and butene and butadiene molecules would fall under the general description "C4." The pyrolysis oil may have a C4-C30 hydrocarbon content of at least 55, at least 60, at least 65, at least 70, at least 75, at least 80, at least 85, at least 90, or at least 95 weight percent based on the total weight of the pyrolysis oil stream 106.

In an embodiment or in combination with any embodiment mentioned herein, the pyrolysis oil can predominantly comprise C5 to C25 hydrocarbons, C5 to C22 hydrocarbons, or C5 to C20 hydrocarbons. For example, the pyrolysis oil may comprise at least 55, at least 60, at least 65, at least 70, at least 75, at least 80, at least 85, at least 90, or at least 95 weight percent of C5 to C25 hydrocarbons, C5 to C22 hydrocarbons, or C5 to C20 hydrocarbons, based on the total weight of the pyrolysis oil stream 106.

In an embodiment or in combination with any embodiment mentioned herein, the pyrolysis oil may also include various amounts of olefins and aromatics depending on reactor conditions and whether or not a catalyst is employed. The pyrolysis oil may comprise at least 1, at least 5, at least 10, at least 15, at least 20, at least 25, at least 30, at least 35, or at least 40 weight percent of olefins and/or aromatics, based on the total weight of the pyrolysis oil stream 106. Additionally, or alternatively, the pyrolysis oil may include not more than 90, not more than 80, not more than 70, not more than 60, not more than 50, not more than 45, not more than 40, not more than 35, not more than 30, not more than 25, not more than 20, not more than 15, not more than 10, not more than 5, or not more than 1 weight percent of olefins and/or aromatics, based on the total weight of the pyrolysis oil stream 106. As used herein, the term "aromatics" refers to the total amount (in weight) of any compounds containing an aromatic moiety, such as benzene, toluene, xylene, and styrene.

In an embodiment or in combination with any embodiment mentioned herein, the pyrolysis oil may have a mid-boiling point in the range of 75 to 250° C., 90 to 225° C., or 115 to 190° C. as measured according to ASTM D-5399. As used herein, "mid-boiling point" refers to the median boiling point temperature of the pyrolysis oil, where 50 percent by volume of the pyrolysis oil boils above the mid-boiling point and 50 percent by volume boils below the mid-boiling point.

In an embodiment or in combination with any embodiment mentioned herein, the boiling point range of the pyrolysis oil may be such that at least 90 percent of the pyrolysis oil boils off at a temperature of 250° C., of 280° C., of 290° C., of 300° C., or of 310° C., as measured according to ASTM D-5399.

Turning to the pyrolysis gas, the pyrolysis gas can have a methane content in the range of 1 to 50 weight percent, 5 to 50 weight percent, or 15 to 45 weight percent, based on the total weight of the pyrolysis gas stream 108.

In an embodiment or in combination with any embodiment mentioned herein, the pyrolysis gas can have a C3 and/or C4 hydrocarbon content (including all hydrocarbons having 3 or 4 carbon atoms per molecule) in the range of 10 to 90 weight percent, 25 to 90 weight percent, or 25 to 80 weight percent, based on the total weight of the pyrolysis gas stream 108.

In an embodiment or in combination with any embodiment mentioned herein, the pyrolysis gas can have a combined ethylene and propylene content of at least 25, at least 40, at least 50, at least 60, at least 70, or at least 75 weight percent, based on the total weight of the pyrolysis gas stream 108.

Turning to the pyrolysis residue, in an embodiment or in combination with any embodiment mentioned herein, the pyrolysis residue comprises at least 20, at least 25, at least 30, at least 35, at least 40, at least 45, at least 50, at least 55, at least 60, at least 65, at least 70, at least 75, at least 80, or at least 85 weight percent of C20+ hydrocarbons based on the total weight of the pyrolysis residue. As used herein, "C20+ hydrocarbon" refers to hydrocarbon compounds containing at least 20 total carbons per molecule, and encompasses all olefins, paraffins, and isomers having that number of carbon atoms.

In an embodiment or in combination with any embodiment mentioned herein, at least a portion of the pyrolysis gas stream 106, pyrolysis oil stream 108, and pyrolysis residue stream 114 may be routed to one or more other chemical processing facilities, including, for example, the cracking facility 14. In some embodiments, at least a portion of the pyrolysis gas stream 106, pyrolysis oil stream 108, and/or pyrolysis residue stream 114 may be routed to one or more separation facilities (not shown in FIG. 1) to thereby form more purified streams of the pyrolysis gas, pyrolysis oil, and/or pyrolysis residue, which may then be routed to the cracking facility 14.

Cracking

In an embodiment or in combination with any embodiment mentioned herein, at least a portion of one or more streams from the pyrolysis facility, including the pyrolysis oil stream 106 and/or the pyrolysis gas stream 108, may be introduced into a cracking facility 14. As used herein, the term "cracking" refers to breaking down complex organic molecules into simpler molecules by the breaking of carbon-carbon bonds. A "cracking facility" is a facility that includes all equipment, lines, and controls necessary to carry out cracking of a feedstock derived from waste plastic. A cracking facility can include one or more cracker furnaces, as well as a downstream separation zone including equipment used to process the effluent of the cracker furnace(s). As used herein, the terms "cracker" and "cracking" are used interchangeably.

In general, the cracker facility 14 may include a cracker furnace and a separation zone downstream of the cracker furnace for separating the furnace effluent into various end products, such as a recycle content olefin (r-olefin) stream. In an embodiment or in combination with any embodiment mentioned herein, at least a portion of the pyrolysis oil stream 106 and/or the pyrolysis gas stream 108 can be sent to the cracking facility 14. The pyrolysis oil stream 106 may be introduced into an inlet of the cracker furnace, while the pyrolysis gas stream 108 can be introduced into a location upstream or downstream of the furnace. A stream of paraffin (e.g., ethane and/or propane) may be withdrawn from the separation zone and may include recycle-content paraffin (r-paraffin). When used, the pyrolysis oil stream 106 and/or pyrolysis gas stream 108 may optionally be combined with a stream of cracker feed to form the feed stream to the cracking facility 14.

In some embodiments, the cracker feed stream can include a hydrocarbon feed other than pyrolysis gas and pyrolysis oil in an amount of from 5 to 95 weight percent, 10 to 90 weight percent, or 15 to 85 weight percent, based on the total weight of the cracker feed.

In an embodiment or in combination with any embodiment mentioned herein, the cracker facility 14 may comprise a single cracking furnace, or it can have at least 2, or at least 3, or at least 4, or at least 5, or at least 6, or at least 7, or at least 8 or more cracking furnaces operated in parallel. Any one or each furnace(s) may be gas cracker, or a liquid cracker, or a split furnace.

The cracker feed stream, along with the pyrolysis oil and/or pyrolysis gas, may pass through the cracking furnace, wherein the hydrocarbon components therein are thermally cracked to form lighter hydrocarbons, including olefins such as ethylene, propylene, and/or butadiene. The residence time of the cracker stream in the furnace can be in the range of from 0.15 to 2 seconds, 0.20 to 1.75 seconds, or 0.25 to 1.5 seconds.

The temperature of the cracked olefin-containing effluent withdrawn from the furnace outlet can be in the range of from 730 to 900° C., 750 to 875° C., or 750 to 850° C.

In an embodiment or in combination with any embodiment mentioned herein, the olefin-containing effluent stream withdrawn from the cracking facility 14 can comprise at least 10, at least 15, at least 20, at least 25, at least 30, at least 35, at least 40, at least 45, at least 50, at least 55, at least 60, at least 65, at least 70, at least 75, at least 80, at least 85, or at least 90 weight percent of C2 to C4 olefins, based on the total weight of the olefin-containing effluent stream. The olefin-containing effluent stream may comprise predominantly ethylene, predominantly propylene, or predominantly ethylene and propylene, based on the total weight of the olefin-containing effluent stream.

In an embodiment or in combination with any embodiment mentioned herein, when introduced into the cracker facility 14, the pyrolysis gas 106 may be introduced into the inlet of the cracker furnace, or all or a portion of the pyrolysis gas 108 may be introduced downstream of the furnace outlet, at a location upstream of or within the separation zone of the cracker facility 14. When introduced into or upstream of the separation zone, the pyrolysis gas 108 can be introduced upstream of the last stage of compression, or prior to the inlet of at least one fractionation column in a fractionation section of the separation zone.

Upon exiting the cracker furnace outlet, the olefin-containing effluent stream may be cooled rapidly (e.g., quenched) in order to prevent production of large amounts of undesirable by-products and to minimize fouling in downstream equipment.

In one embodiment or in combination with one or more embodiments disclosed herein, the cracker furnace can be operated at a product outlet temperature (e.g., coil outlet temperature) of at least 700, at least 750, at least 800, or at least 850° C. The feed to the cracker furnace can have a number average molecular weight (Mn) of less than 3000, less than 2000, less than 1000, or less than 500 g/mole. If the feed to the cracker furnace contains a mixture of components, the Mn of the cracker feed is the weighted average Mn of all feed components, based on the mass of the individual feed components. The feed to the cracker furnace can comprise less than 5, less than 2, less than 1, less than 0.5, or 0.0 weight percent of coal, biomass, and/or solids. In certain embodiments, a co-feed stream, such as steam or a sulfur-containing stream (for metal passivation) can be introduced into the cracker furnace. The cracker furnace can include both convection and radiant sections and can have a tubular reaction zone (e.g., coils in one or both of the convection and radiant sections). Typically, the residence time of the streams passing through the reaction zone (from the convection section inlet to the radiant section outlet) can be less than 20 seconds, less than 10 seconds, less than 5 seconds, or less than 2 seconds.

In an embodiment or in combination with any embodiment mentioned herein, at least a portion of one or more of the above streams may be introduced into one or more of the facilities shown in FIG. 1, while, in other embodiments, all or a portion of the streams withdrawn from the separation zone of the cracking facility may be routed to further separation and/or storage, transportation, sale, and/or use.

Pyrolysis Effluent Heat Integration

As noted above, we have discovered that the carbon footprint and global warming potential of the chemical recycling facility 10 may be lowered by recycling residual heat from the pyrolysis effluent back into the chemical recycling process. Turning again to FIG. 1, the chemical recycling facility may contain at least one heat transfer medium loop 110 containing at least one heat transfer medium that can transfer at least a portion of the heat energy from the pyrolysis effluent 104, pyrolysis oil stream 106, and/or the pyrolysis gas stream 108 back to the plastic liquification zone 20.

As shown in FIG. 1, the heat transfer medium in the heat transfer medium loop 110 may recover heat energy from at least a portion of the pyrolysis effluent 104, the pyrolysis oil stream 106, and/or the pyrolysis gas stream 108 via heat exchangers 22. While in these heat exchangers, the heat transfer medium can recover at least a portion of the heat energy from the pyrolysis effluent 104, the pyrolysis oil stream 106, and/or the pyrolysis gas stream 108 via indirect heat exchange. The heat exchangers 22 can comprise any conventional cross-flow heat exchangers known in the art, such as a transfer line exchanger. In certain embodiments, the heat exchangers may comprise a brazed aluminum heat exchanger comprising a plurality of cooling and warming passes (e.g., cores) disposed therein for facilitating indirect heat exchange between one or more process streams and at least one heat transfer medium stream. Although generally illustrated in FIG. 1 as comprising a single core or "shell," it should be understood that the heat exchangers 22 can, in some embodiments, comprise two or more separate core or shells.

In an embodiment or in combination with any embodiment mentioned herein, the heat transfer medium in the heat transfer medium loop 110 may recover heat energy from at least a portion of the pyrolysis effluent 104. During such embodiments, the heat transfer medium may or may not also recover heat energy from at least a portion of the pyrolysis oil stream 106 and/or the pyrolysis gas stream 108.

In an embodiment or in combination with any embodiment mentioned herein, the heat transfer medium in the heat transfer medium loop 110 may recover heat energy from at least a portion of the pyrolysis oil stream 106 and the pyrolysis gas stream 108. In such embodiments, the heat transfer medium may first recover heat energy from the lower-temperature pyrolysis gas stream 106 and then recover heat energy from the higher-temperature pyrolysis gas stream 108. Furthermore, in such embodiments, the heat transfer medium may or may not also recover heat energy from at least a portion of the pyrolysis effluent 104.

In an embodiment or in combination with any embodiment mentioned herein, the heat transfer medium in the heat transfer medium loop 110 may recover heat energy from at least a portion of the pyrolysis gas stream 108. During such embodiments, the heat transfer medium may or may not also recover heat energy from at least a portion of the pyrolysis effluent 104 and/or the pyrolysis oil stream 106.

After indirect heat exchange with the pyrolysis effluent 104, the pyrolysis oil stream 106, and/or the pyrolysis gas stream 108, the temperature of the heat transfer medium in the heat transfer medium loop 110 can increase by at least 25, at least 50, at least 75, at least 100, at least 125, at least 150, at least 175, or at least 200° C. and/or not more than 400, not more than 350, not more than 300, or not more than 250° C.

In an embodiment or in combination with any embodiment mentioned herein, after indirect heat exchange with the pyrolysis effluent 104, the pyrolysis oil stream 106, and/or the pyrolysis gas stream 108, the heated heat transfer medium may have a temperature of at least 150, at least 175, at least 200, at least 210, at least 220, at least 230, at least 240, at least 250, at least 260, at least 270, at least 280, at least 290, at least 300, at least 320, at least 340, at least 350, at least 360, at least 370, at least 380, at least 390, or at least 400° C. Additionally, or alternatively, after indirect heat exchange with the pyrolysis effluent 104, the pyrolysis oil stream 106, and/or the pyrolysis gas stream 108, the heated heat transfer medium may have a temperature of less than 600, less than 550, less than 500, less than 450, less than 400, less than 390, less than 380, less than 370, less than 360, less than 350, less than 340, less than 330, less than 320, less than 310, less than 300, or less than 290° C. In various embodiments, after indirect heat exchange with the pyrolysis effluent 104, the pyrolysis oil stream 106, and/or the pyrolysis gas stream 108, the heated heat transfer medium may have a temperature in the range of 200 to 600° C., 250 to 550° C., 290 to 500° C., or 300 to 450° C.

Turning again to FIG. 1, after withdrawing heat energy from the pyrolysis effluent 104, the pyrolysis oil stream 106, and/or the pyrolysis gas stream 108, at least a portion of the heat transfer medium in the heat transfer medium loop 110 may be routed to the plastic liquification zone 20. While in the liquification zone 20, the heated heat transfer medium may provide heat energy to the plastic liquification processes described herein. For example, the liquification vessel (e.g., the melt tank and/or extruder) may comprise: (i) internal coils through which the heated transfer medium can flow and/or (ii) external coils and/or jacketing that allows the heated heat transfer medium to flow therethrough and thereby provide heat energy to the plastic liquification process occurring in the liquification vessel.

In an embodiment or in combination with any embodiment mentioned herein, the heated heat transfer medium may provide heat energy via indirect heat exchange to the plastic liquification zone 20 by: (i) routing the heated heat transfer medium through one or more internal coils within the liquification vessel (e.g., a melt tank, a CSTR, and/or an extruder); (ii) routing the heated heat transfer medium through one or more external coils outside of the liquification vessel (e.g., a melt tank, a CSTR, and/or an extruder); (iii) routing the heated heat transfer medium through a heating jacket positioned outside of the liquification vessel (e.g., a melt tank, a CSTR, and/or an extruder); and/or (iv) routing the heated heat transfer medium through an external heat exchanger (not shown) within the liquification zone 20.

The heat transfer medium can be any conventional heat transfer medium known in the art. In an embodiment or in combination with any embodiment mentioned herein, the heat transfer medium can be a non-aqueous fluid or an aqueous fluid (e.g., water and/or steam). The heat transfer medium may also be a single-phase medium (e.g., liquid or vapor) or a two-phase medium (e.g., liquid/vapor) while in the loop 110. In certain embodiments, the heat transfer medium may be in a liquid phase prior to heating (e.g., water) and then transition to another phase (e.g., steam) or a mixed phase (e.g., water/steam) upon heating.

Examples of suitable non-aqueous heat transfer media that can be used as the heat transfer medium includes an oil, a siloxane, a molten metal, a molten salt, or a combination thereof.

In an embodiment or in combination with any embodiment mentioned herein, the heat transfer medium comprises a non-aqueous heat transfer medium, such as a synthetic oil (e.g., THERMINOL®), a refined oil (e.g., a mineral oil), or a combination thereof. As used herein, a "refined oil" refers to a natural (i.e., non-synthetic) oil that has been subjected to a distillation and/or or purification step.

In an embodiment or in combination with any embodiment mentioned herein, the heat transfer medium comprises a siloxane.

In an embodiment or in combination with any embodiment mentioned herein, the heat transfer medium comprises a molten salt. Exemplary molten salts include sodium chloride, sodium nitrate, potassium nitrate, or a combination thereof.

In an embodiment or in combination with any embodiment mentioned herein, the heat transfer medium comprises a molten metal. Exemplary molten metals can include lithium, gallium, sodium, cadmium, potassium, indium, lead, tin, bismuth, thallium, or a combination thereof.

In an embodiment or in combination with any embodiment mentioned herein, the heat transfer medium comprises an aqueous fluid, such as steam and/or water. If the heat transfer medium comprises steam, then the heat transfer medium loop 110 may be in fluid communication with a steam generator that provides the steam and/or water. In certain embodiments, the steam generator may generate the heat transfer medium from boiler feed water derived from the cracker facility 14. Additionally, or alternatively, the steam generator may also comprise a temperator for adding additional heat energy to the heat transfer medium that is provided.

In an embodiment or in combination with any embodiment mentioned herein, the heat transfer medium comprises steam. The steam can comprise a pressure of at least 700, at least 800, at least 900, at least 1,000, at least 1,100, at least 1,200, at least 1,300, at least 1,400, at least 1,500, or at least 1590 psi and/or less than 2,000, less than 1,800, less than 1,700, or less than 1,650 psi. In certain embodiments, the steam can comprise 1,600 psi steam.

Figure 2:
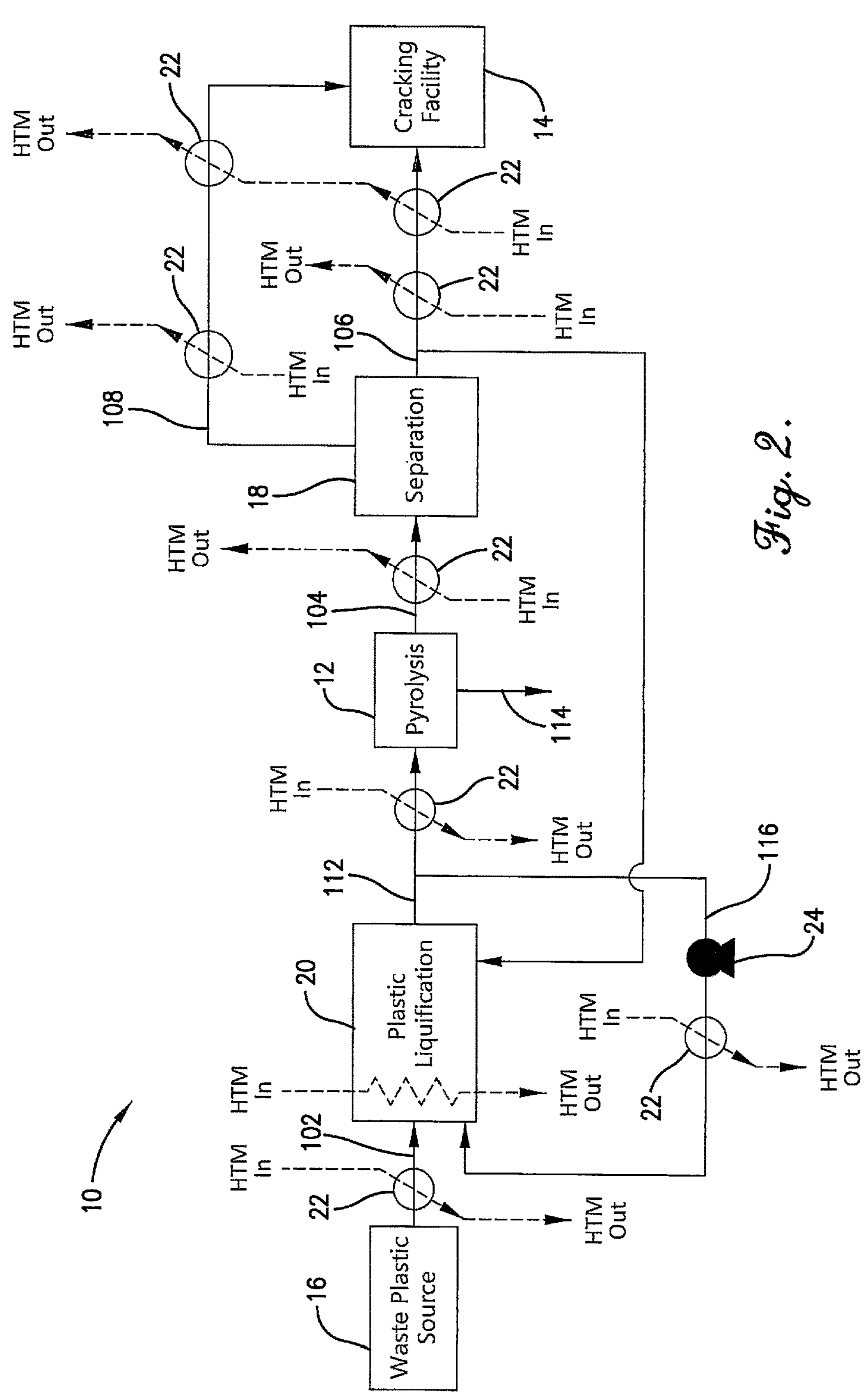
FIG. 2 is a block flow diagram illustrating the main steps of a process and facility for chemically recycling waste plastic and reutilizing heat from the pyrolysis effluent via a heat transfer medium according to embodiments of the present technology.

FIG. 2 provides a more detailed breakdown on how the heat transfer medium may recycle heat energy derived from the pyrolysis effluent 104, the pyrolysis oil stream 106, and/or the pyrolysis gas stream 108 in the chemical recycling facility 10. As shown in FIG. 2, the heat transfer medium (HTM) may recover heat energy from the pyrolysis effluent 104, the pyrolysis oil stream 106, and/or the pyrolysis gas stream 108 as described above in regard to FIG. 1. More particularly, as depicted in FIG. 2, the heat transfer medium (HTM) may recover heat energy from any one of or a combination of the pyrolysis effluent 104, the pyrolysis oil stream 106, and the pyrolysis gas stream 108.

Additionally, or alternatively, as shown in FIG. 2, at least a portion of the liquefied plastic stream 112 may be diverted back to the plastic liquification zone via side stream 116. The liquefied plastic side stream 116 can be pumped back into the liquification zone 20, particularly into the liquification vessel (e.g., melt tank or extruder) used in the liquification zone 20, using a pump 24. In such embodiments, the heated heat transfer medium may be used to provide heat energy to the liquefied plastic side stream 116 via indirect heat exchange in a heat exchanger 22, prior to introducing the stream 116 back into the liquification zone 20. Consequently, this can further heat the liquefied waste plastics in the side stream 116. Thus, due to its increased temperature, the heated side stream 116 can further facilitate the plastic liquification processes occurring in the liquification zone 20.

Additionally, or alternatively, as shown in FIG. 2, the heated heat transfer medium may also provide heat energy to the waste plastic feed stream 102 prior to introducing the waste plastic feed stream 102 into the liquification zone 20. Consequently, this can further heat the waste plastics in the waste plastic feed stream 102. Thus, due to its increased temperature, the heated the waste plastic feed stream 102 can further facilitate the plastic liquification processes occurring in the liquification zone 20.

Additionally, or alternatively, as shown in FIG. 2, the heated heat transfer medium may also provide heat energy directly or indirectly to the plastic liquification zone 20 as described above in regard to FIG. 1.

Additionally, or alternatively, as shown in FIG. 2, at least a portion of the pyrolysis oil stream 106 may be diverted back to the plastic liquification zone 20 to facilitate the formation of the liquefied plastic stream 112. As described above, at least a portion of the pyrolysis oil stream 116 may be directly or indirectly added to the plastic liquification vessel (e.g., a melt tank or extruder).

For the purposes of simplicity, FIG. 2 does not depict the entire heat transfer medium loops. Rather, FIG. 2 depicts where the heat transfer medium (HTM) can be introduced into the facility 10 ("HTM In") and where it can exit after being heated or being cooled ("HTM Out"). For example, as shown in FIG. 1, the heat transfer medium may be heated via indirect heat exchange with the pyrolysis effluent stream 104 in heat exchanger 26 and then loop around to the provide this heat to the waste plastic stream 102. Although FIG. 2 depicts the heat transfer medium (HTM) as going "In" and "Out," the heat transfer medium can be contained in the heat transfer medium loops, which are not depicted in their entirety in FIG. 2.

Figure 3A:
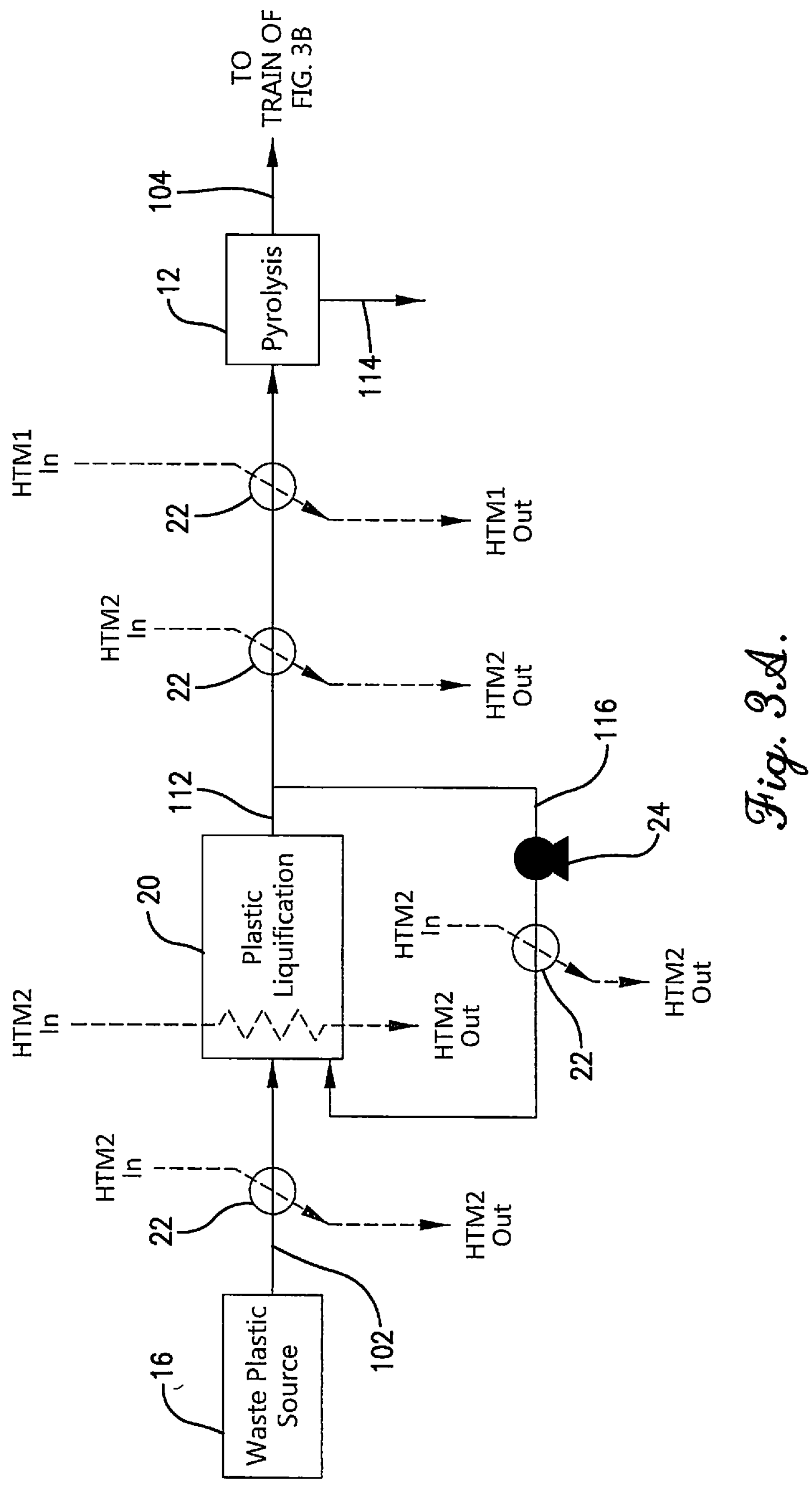
FIG. 3A is a block flow diagram illustrating the main steps of a process and facility for chemically recycling waste plastic and reutilizing heat from the pyrolysis effluent via two heat transfer media according to embodiments of the present technology.
Figure 3B:
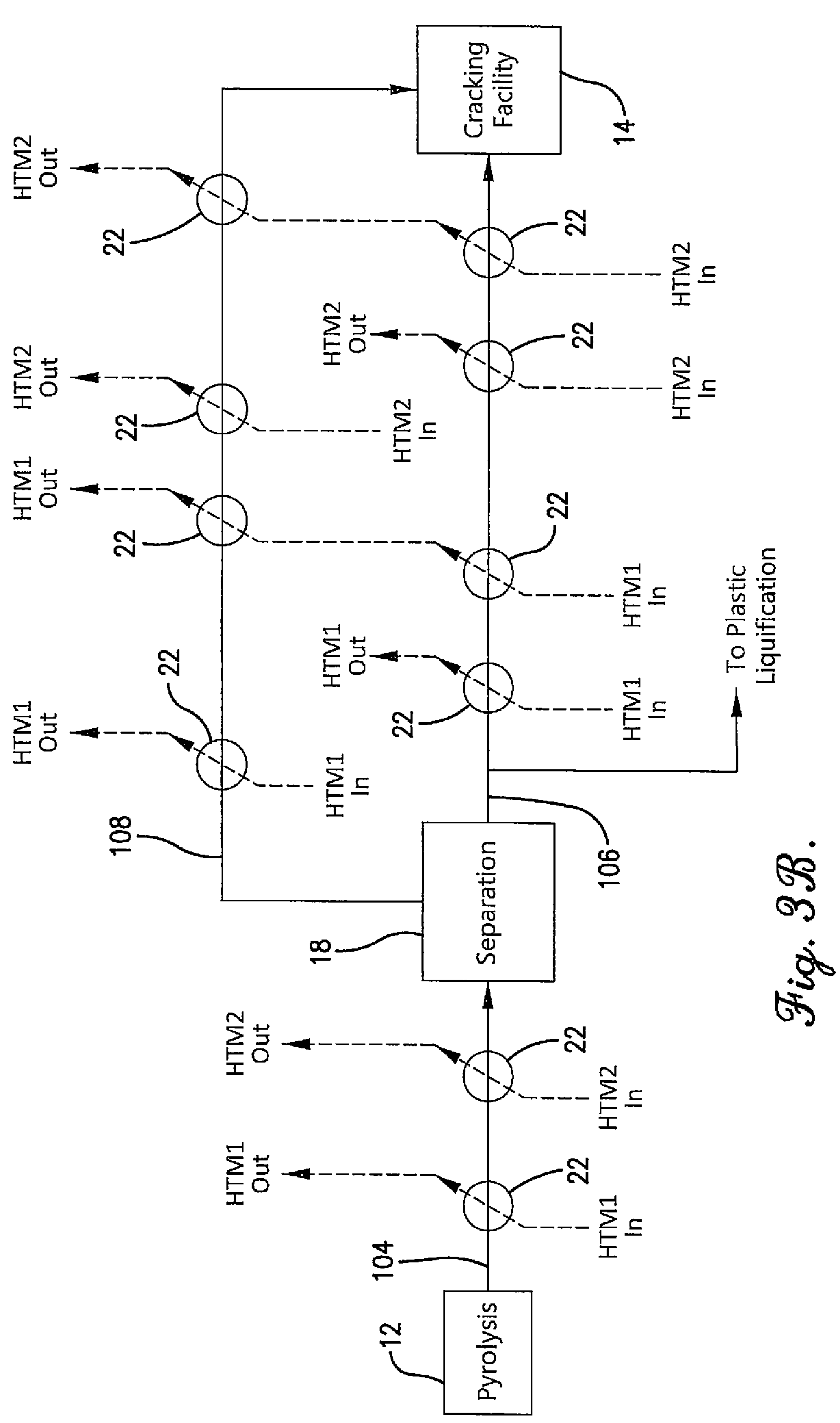
FIG. 3B is a block flow diagram illustrating the main steps of a process and facility for chemically recycling waste plastic and reutilizing heat from the pyrolysis effluent via two heat transfer media according to embodiments of the present technology.

FIGS. 3A and 3B provide a more detailed breakdown on how at least two separate heat transfer media may be used to recycle heat energy derived from the pyrolysis effluent 104, the pyrolysis oil stream 106, and/or the pyrolysis gas stream 108 in the chemical recycling facility 10. More particularly, as shown in FIG. 2, a first heat transfer medium (HTM1) and a second heat transfer medium (HTM2) can be used, wherein the first heat transfer medium is capable of operating at higher temperatures relative to the second heat transfer medium. Unless otherwise noted, the indirect heat exchange mechanisms and processes shown in FIGS. 3A and 3B operate in the same manner as described above regarding FIGS. 1 and 2.

As shown in FIGS. 3A and 3B, the first heat transfer medium (HTM1) can initially recover at least a portion of the heat energy from at least a portion of the pyrolysis effluent 104, the pyrolysis oil stream 106, and/or the pyrolysis gas stream 108 via indirect heat exchange in heat exchangers 22. Subsequently, downstream of the first heat transfer medium (HTM1), the second heat transfer medium (HTM2) may recover at least a portion of the remaining heat energy from at least a portion of the pyrolysis effluent 104, the pyrolysis oil stream 106, and/or the pyrolysis gas stream 108 via indirect heat exchange in heat exchangers 22. Since the first heat transfer medium was subjected to heating first, the heated first heat transfer medium should have a higher operating temperature relative to the heated second heat transfer medium.

In an embodiment or in combination with any embodiment mentioned herein, the first heat transfer medium (HTM1) and/or the second heat transfer medium (HTM2) may recover at least a portion of the heat energy from any one of or a combination of the pyrolysis effluent 104, the pyrolysis oil stream 106, and/or the pyrolysis gas stream 108.

In an embodiment or in combination with any embodiment mentioned herein, after indirect heat exchange with the pyrolysis effluent 104, the pyrolysis oil stream 106, and/or the pyrolysis gas stream 108, the heated first heat transfer medium (HTM1) may have a temperature of at least 270, at least 280, at least 290, at least 300, at least 320, at least 340, at least 350, at least 360, at least 370, at least 380, at least 390, or at least 400° C. Additionally, or alternatively, after indirect heat exchange with the pyrolysis effluent 104, the pyrolysis oil stream 106, and/or the pyrolysis gas stream 108, the heated first heat transfer medium (HTM1) may have a temperature of less than 600, less than 550, less than 500, less than 450, less than 400, less than 390, less than 380, less than 370, less than 360, or less than 350° C. In various embodiments, after indirect heat exchange with the pyrolysis effluent 104, the pyrolysis oil stream 106, and/or the pyrolysis gas stream 108, the heated first heat transfer medium (HTM1) may have a temperature in the range of 270 to 600° C., 290 to 550° C., 300 to 500° C., or 350 to 450° C.

In an embodiment or in combination with any embodiment mentioned herein, after indirect heat exchange with the pyrolysis effluent 104, the pyrolysis oil stream 106, and/or the pyrolysis gas stream 108, the heated second heat transfer medium (HTM2) may have a temperature of at least 150, at least 175, at least 200, at least 210, at least 220, at least 230, at least 240, at least 250, at least 260, or at least 270° C. Additionally, or alternatively, after indirect heat exchange with the pyrolysis effluent 104, the pyrolysis oil stream 106, and/or the pyrolysis gas stream 108, the heated second heat transfer medium (HTM2) may have a temperature of less than 500, less than 450, less than 400, less than 390, less than 380, less than 370, less than 360, less than 350, less than 340, less than 330, less than 320, less than 310, less than 300, or less than 290° C. In various embodiments, after indirect heat exchange with the pyrolysis effluent 104, the pyrolysis oil stream 106, and/or the pyrolysis gas stream 108, the heated second heat transfer medium (HTM2) may have a temperature in the range of 200 to 500° C., 230 to 450° C., 250 to 400° C., or 300 to 390° C.

Turning again to FIG. 3A, after withdrawing heat energy from the pyrolysis effluent 104, the pyrolysis oil stream 106, and/or the pyrolysis gas stream 108, at least a portion of the heated second heat transfer medium (HTM2) may be routed to the plastic liquification zone 20 so as to provide heat energy to the waste plastic feed stream 102, the side stream 116, and/or the liquification vessel in the liquification zone 20 as described above in regard to FIGS. 1 and 2. Additionally, or alternatively, at least a portion of the heated second heat transfer medium (HTM2) may be used to provide heat energy to the liquefied plastic stream 112 from the liquification zone 20 via indirect heat exchange in a heat exchanger 22. In such embodiments, the heated second heat transfer medium (HTM2) can effectively further preheat the liquefied plastic stream 112 prior to the stream being introduced into the pyrolysis reactor 12. Consequently, this can help alleviate the need to add further heat energy to the pyrolysis reactor 12 to help drive the pyrolysis reaction.

Furthermore, as shown in FIG. 3A, after withdrawing heat energy from the pyrolysis effluent 104, the pyrolysis oil stream 106, and/or the pyrolysis gas stream 108, at least a portion of the heated first heat transfer medium (HTM1) may be routed downstream of the plastic liquification zone 20 so as to provide additional heat energy to the liquefied plastic stream 112 from the liquification zone 20 via indirect heat exchange in a heat exchanger 22. In such embodiments, the heated first heat transfer medium (HTM1) can effectively further preheat the liquefied plastic stream 112 prior to the stream being introduced into the pyrolysis reactor 12. Consequently, this can help alleviate the need to add further heat energy to the pyrolysis reactor 12 to help drive the pyrolysis reaction. If the heated second heat transfer medium (HTM2) is also used to provide heat energy to the liquefied plastic stream 112, then the heated first heat transfer medium (HTM1) may provide additional heat energy to the liquefied plastic stream 112 downstream of the heated second heat transfer medium (HTM2).

As noted above, the first heat transfer (HTM1) may be chosen so as to be able to handle higher temperatures relative to the second heat transfer medium (HTM2). In certain embodiments, the first heat transfer medium (HTM1) and the second heat transfer medium (HTM2) may both comprise an aqueous heat transfer medium, such as steam. Alternatively, in other embodiments, the first heat transfer medium (HTM1) and the second heat transfer medium (HTM2) may both comprise a non-aqueous heat transfer medium. In yet other embodiments, the first heat transfer medium (HTM1) and the second heat transfer medium (HTM2) may comprise an aqueous heat transfer medium (e.g., steam) and a non-aqueous heat transfer medium (e.g., a synthetic oil), respectively. In yet other alternative embodiments, the first heat transfer medium (HTM1) and the second heat transfer medium (HTM2) may comprise a non-aqueous heat transfer medium (e.g., a molten salt) and an aqueous heat transfer medium (e.g., water and/or steam), respectively.

In an embodiment or in combination with any embodiment mentioned herein, the first heat transfer medium (HTM1) comprises a heat transfer medium capable of handling higher temperatures, such as a steam, a molten metal, or a molten salt. Exemplary molten metals can include lithium, gallium, sodium, cadmium, potassium, indium, lead, tin, bismuth, thallium, or a combination thereof and exemplary molten salts include sodium chloride, sodium nitrate, potassium nitrate, or a combination thereof. When the first heat transfer medium (HTM1) comprises steam, the steam can comprise a pressure of at least 700, at least 800, at least 900, at least 1,000, at least 1,100, at least 1,200, at least 1,300, at least 1,400, at least 1,500, or at least 1590 psi and/or less than 2,000, less than 1,800, less than 1,700, or less than 1,650 psi. In certain embodiments, the steam can comprise 1,600 psi steam.

In an embodiment or in combination with any embodiment mentioned herein, the second heat transfer medium (HTM2) comprises a heat transfer medium capable of handling lower temperatures, such as a synthetic oil, a refined oil, a siloxane, or a combination thereof.

In an embodiment or in combination with any embodiment mentioned herein, the first heat transfer medium (HTM1) and the second heat transfer medium (HTM2) may both comprise a non-aqueous fluid. In such embodiments, the first heat transfer medium (HTM1) may comprise a molten metal, a molten salt, or a combination thereof.

Additionally, or alternatively, the second heat transfer medium (HTM2) may comprise a synthetic oil (e.g., THERMINOL®), a refined oil (e.g., a mineral oil), a siloxane, or a combination thereof.

In an embodiment or in combination with any embodiment mentioned herein, the first heat transfer medium (HTM1) and the second heat transfer medium (HTM2) may both comprise an aqueous fluid. In such embodiments, the first heat transfer medium (HTM1) may comprise a steam containing a pressure of at least 700, at least 800, at least 900, at least 1,000, at least 1,100, at least 1,200, at least 1,300, at least 1,400, at least 1,500, or at least 1590 psi and/or less than 2,000, less than 1,800, less than 1,700, or less than 1,650 psi. Additionally, or alternatively, the second heat transfer medium (HTM2) may comprise a steam containing a pressure of less than 700, less than 600, less than 500, less than 400, less than 300, less than 200, less than 150, less than 100, or less than 50 psi. In certain embodiments, the first heat transfer medium (HTM1) may comprise 1,600 psi steam and the second heat transfer medium (HTM2) may comprise 30 psi steam.

Figure 4A:
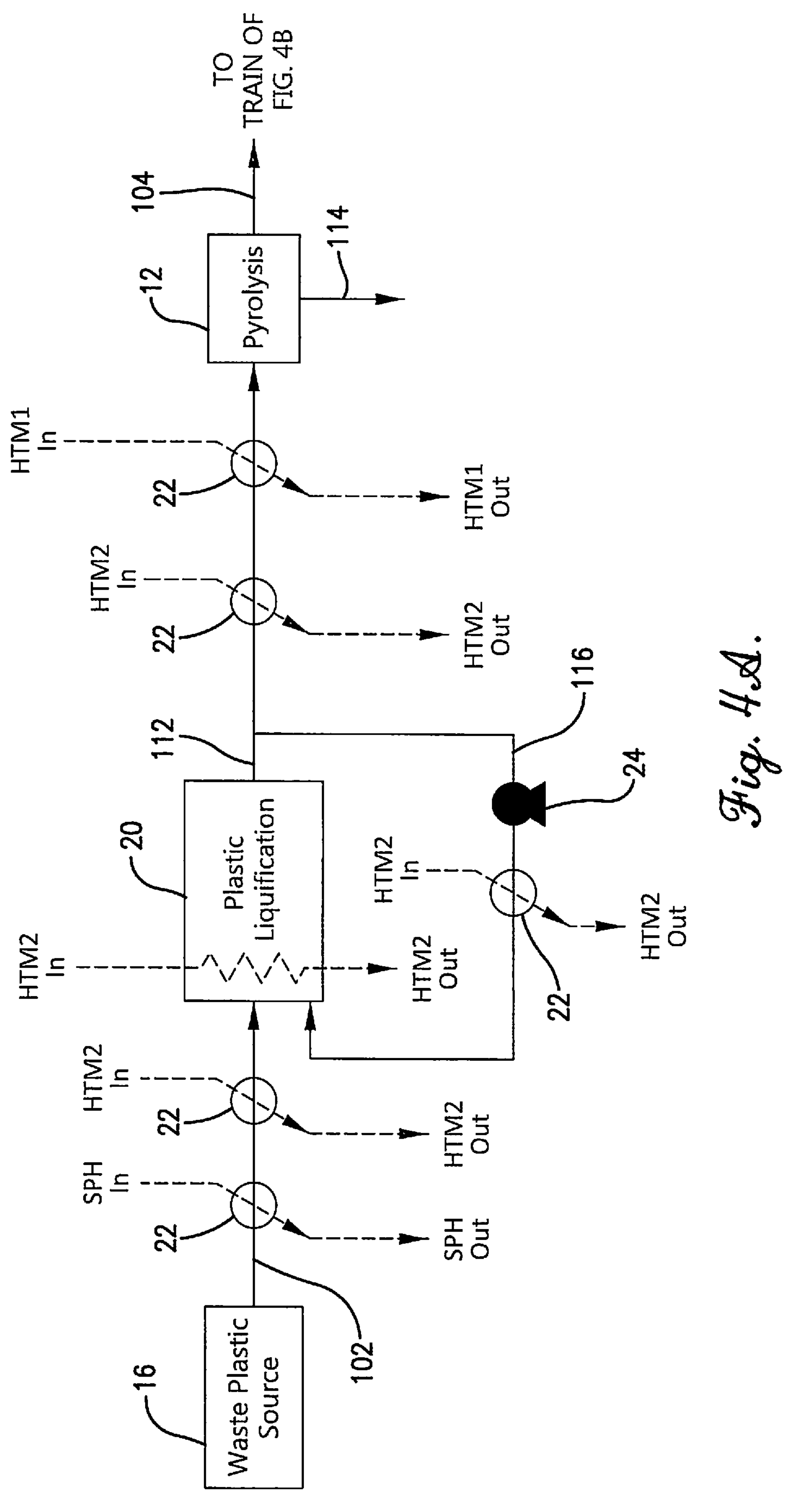
FIG. 4A is a block flow diagram illustrating the main steps of a process and facility for chemically recycling waste plastic and reutilizing heat from the pyrolysis effluent via three heat transfer media according to embodiments of the present technology.
Figure 4B:
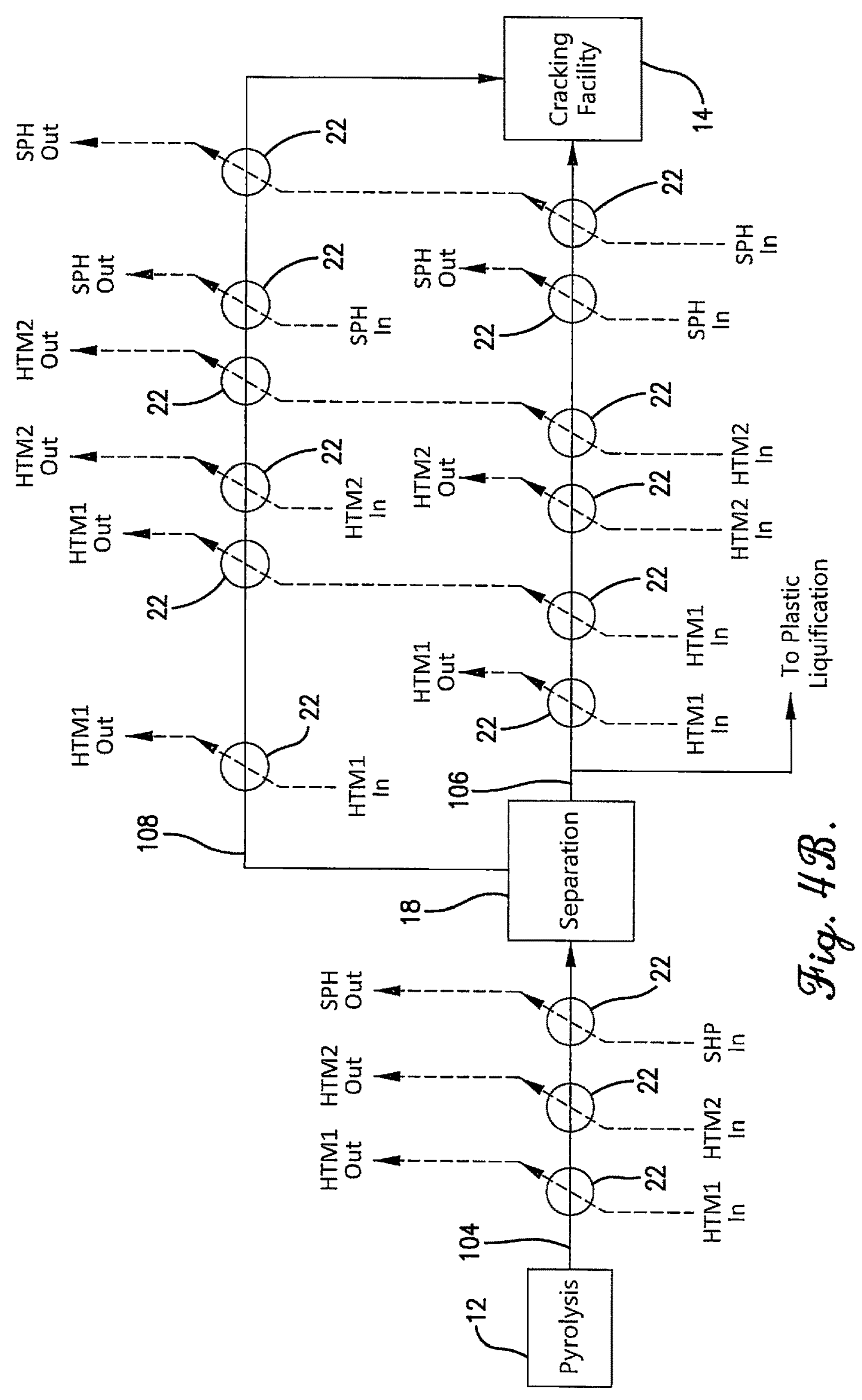
FIG. 4B is a block flow diagram illustrating the main steps of a process and facility for chemically recycling waste plastic and reutilizing heat from the pyrolysis effluent via three heat transfer media according to embodiments of the present technology.

FIGS. 4A and 4B provide a more detailed breakdown on how a secondary preheating (SPH) fluid may also be used, in addition to the first heat transfer medium (HTM1) and the second heat transfer medium (HTM2), to effectively recover heat energy from the pyrolysis effluent 104, the pyrolysis oil stream 106, and/or the pyrolysis gas stream 108 in the chemical recycling facility 10. Unless otherwise noted, the indirect heat exchange mechanisms and processes shown in FIGS. 4A and 4B, particularly related to the first heat transfer medium (HTM1) and the second heat transfer medium (HTM2), operate in the same manner as described above regarding FIGS. 1, 2, 3A, and 3B.

As shown in FIGS. 4A and 4B, a secondary preheating fluid (SPH) may be used to supplement the first heat transfer medium (HTM1) and the second heat transfer medium (HTM2). As shown in FIG. 4B, at least a portion of the secondary preheating fluid (SPH) may recover heat energy from the pyrolysis effluent 104, the pyrolysis oil stream 106, and/or the pyrolysis gas stream 108 via indirect heat exchange in a heat exchanger 22, at a point downstream of the first heat transfer medium (HTM1) and the second heat transfer medium (HTM2). Afterwards, as shown in FIG. 4A, the heated secondary preheating fluid (SPH) may provide heat energy to the waste plastic feed stream 102 upstream of the heated first heat transfer medium (HTM1) and the heated second heat transfer medium (HTM2).

In an embodiment or in combination with any embodiment mentioned herein, the secondary preheating fluid (SPH) may comprise air, water, a fuel, a cracking facility processing stream, a pyrolysis facility processing stream, or a combination thereof.

In an embodiment or in combination with any embodiment mentioned herein, after indirect heat exchange with the pyrolysis effluent 104, the pyrolysis oil stream 106, and/or the pyrolysis gas stream 108, the heated secondary preheating fluid (SPH) may have a temperature of at least 40, at least 50, at least 60, at least 70, at least 80, at least 90, or at least 100° C. and/or less than 250, less than 200, less than 175, less than 150, or less than 125° C.

The global warming potential of the chemical recycling facility 10 and the beneficial effects of the above heat integration steps described above may be calculated according to the ISO 14040:2006 and 14044:2006 standards and the cradle-to-gate methodology described in "Life cycle Metrics for Chemical Products" by WBCSD Chemicals (see Example—steam cracker).

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the phrase "at least a portion" includes at least a portion and up to and including the entire amount or time period.

As used herein, "aqueous" refers to a fluid containing at least five percent of molecular water by weight.

As used herein, the term "caustic" refers to any basic solution (e.g., strong bases, concentrated weak bases, etc.) that can be used in the technology as a cleaning agent, for killing pathogens, and/or reducing odors.

As used herein, the term "chemical recycling" refers to a waste plastic recycling process that includes a step of chemically converting waste plastic polymers into lower molecular weight polymers, oligomers, monomers, and/or non-polymeric molecules (e.g., hydrogen, carbon monoxide, methane, ethane, propane, ethylene, and propylene) that are useful by themselves and/or are useful as feedstocks to another chemical production process(es).

As used herein, the term "chemical recycling facility" refers to a facility for producing a recycle content product via chemical recycling of waste plastic.

As used herein, the term "co-located" refers to the characteristic of at least two objects being situated on a common physical site, and/or within one mile of each other.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the term "cracking" refers to breaking down complex organic molecules into simpler molecules by the breaking of carbon-carbon bonds.

As used herein, the term "diameter" means the maximum chord length of a particle (i.e., its largest dimension).

As used herein, the term "depleted" refers to having a concentration (on a dry weight basis) of a specific component that is less than the concentration of that component in a reference material or stream.

As used herein, the term "directly derived" refers to having at least one physical component originating from waste plastic.

As used herein, the term "enriched" refers to having a concentration (on a dry weight basis) of a specific component that is greater than the concentration of that component in a reference material or stream.

As used herein, the term "fluid" may encompass a liquid, a gas, a supercritical fluid, or a combination thereof.

As used herein, the term "halide" refers to a composition comprising a halogen atom bearing a negative charge (i.e., a halide ion).

As used herein, the term "halogen" or "halogens" refers to organic or inorganic compounds, ionic, or elemental species comprising at least one halogen atom.

As used herein, the terms "having," "has," and "have" have the same open-ended meaning as "comprising," "comprises," and "comprise" provided above.

As used herein, a "heat transfer medium loop" or "HTM loop" refers to a system comprising one or more heat exchangers through which a common HTM is circulated to a common HTM supply or a part of a larger system for the purpose of transferring heat and/or energy into and/or out of the chemical recycling process.

As used herein, the terms "including," "include," and "included" have the same open-ended meaning as "comprising," "comprises," and "comprise" provided above.

As used herein, the term "indirectly derived" refers to having an assigned recycle content i) that is attributable to waste plastic, but ii) that is not based on having a physical component originating from waste plastic.

As used herein, the term "isolated" refers to the characteristic of an object or objects being by itself or themselves and separate from other materials, in motion or static.

As used herein, "non-aqueous" refers to a fluid containing less than five percent of molecular water by weight.

As used herein, the terms "mixed plastic waste" and "MPW" refer to a mixture of at least two types of waste plastics including, but not limited to the following plastic types: polyethylene terephthalate (PET), one or more polyolefins (PO), and polyvinylchloride (PVC).

As used herein, the term "overhead" refers to the physical location of a structure that is above a maximum elevation of quantity of particulate plastic solids within an enclosed structure.

As used herein, the term "partially processed waste plastic" means waste plastic that has been subjected to at least on automated or mechanized sorting, washing, or comminuted step or process. Partially processed waste plastics may originate from, for example, municipal recycling facilities (MRFs) or reclaimers. When partially processed waste plastic is provided to the chemical recycling facility, one or more preprocessing steps may me skipped.

As used herein, the term "physical recycling" (also known as "mechanical recycling") refers to a waste plastic recycling process that includes a step of melting waste plastic and forming the molten plastic into a new intermediate product (e.g., pellets or sheets) and/or a new end product (e.g., bottles). Generally, physical recycling does not substantially change the chemical structure of the plastic, although some degradation is possible.

As used herein, the term "plastic" may include any organic synthetic polymers that are solid at 25° C. and 1 atmosphere of pressure.

As used herein, the term "predominantly" means more than 50 percent by weight. For example, a predominantly propane stream, composition, feedstock, or product is a stream, composition, feedstock, or product that contains more than 50 weight percent propane.

As used herein, the term "preprocessing" refers to preparing waste plastic for chemical recycling using one or more of the following steps: (i) comminuting, (ii) particulating, (iii) washing, (iv) drying, and/or (v) separating.

As used herein, the term "pyrolysis" refers to thermal decomposition of one or more organic materials at elevated temperatures in an inert (i.e., substantially oxygen free) atmosphere.

As used herein, the term "pyrolysis char" refers to a carbon-containing composition obtained from pyrolysis that is solid at 200° C. and 1 atm.

As used herein, the terms "pyrolysis gas" and "pygas" refer to a composition obtained from pyrolysis that is gaseous at 25° C. at 1 atm.

As used herein, the term "pyrolysis heavy waxes" refers to C20+ hydrocarbons obtained from pyrolysis that are not pyrolysis char, pyrolysis gas, or pyrolysis oil.

As used herein, the terms "pyrolysis oil" or "pyoil" refers to a composition obtained from pyrolysis that is liquid at 25° C. and 1 atm.

As used herein, the term "pyrolysis residue" refers to a composition obtained from pyrolysis that is not pyrolysis gas or pyrolysis oil and that comprises predominantly pyrolysis char and pyrolysis heavy waxes.

As used herein, the term "recycle content" and "r-content" refer to being or comprising a composition that is directly and/or indirectly derived from waste plastic.

As used herein, the terms "waste plastic" and "plastic waste" refer to used, scrap, and/or discarded plastic materials. The waste plastic fed to the chemical recycling facility may be unprocessed or partially processed.

As used herein, the term "unprocessed waste plastic" means waste plastic that has not be subjected to any automated or mechanized sorting, washing, or comminuting. Examples of unprocessed waste plastic include waste plastic collected from household curbside plastic recycling bins or shared community plastic recycling containers.

As used herein, the phrase "at least a portion" includes at least a portion and up to and including the entire amount or time period.

As used herein, "downstream" means a target unit operation, vessel, or equipment that:

a. is in fluid (liquid or gas) communication, or in piping communication, with an outlet stream from the radiant section of a cracker furnace, optionally through one or more intermediate unit operations, vessels, or equipment, or
b. was in fluid (liquid or gas) communication, or in piping communication, with an outlet stream from the radiant section of a cracker furnace, optionally through one or more intermediate unit operations, vessels, or equipment, provided that the target unit operation, vessel, or equipment remains within the battery limits of the cracker facility (which includes the furnace and all associated downstream separation equipment).

Additional Claim Supporting Description—First Embodiment

In a first embodiment of the present technology there is provided a chemical recycling process, the process comprising: (a) pyrolyzing waste plastic in a pyrolysis reactor to thereby provide a pyrolysis effluent; (b) heating an aqueous heat transfer medium (HTM) via indirect heat exchange with at least a portion of the pyrolysis effluent to thereby provide a heated aqueous HTM exhibiting a pressure of at least 700 psi; and (c) heating at least a portion of the waste plastic upstream of the pyrolysis reactor with at least a portion of the heated aqueous HTM via indirect heat exchange.

The first embodiment described in the preceding paragraph can also include one or more of the additional aspects/features listed in the following bullet pointed paragraphs. Each of the below additional features of the first embodiment can be standalone features or can be combined with one or more of the other additional features to the extent consistent. Additionally, the following bullet pointed paragraphs can be viewed as dependent claim features having levels of dependency indicated by the degree of indention in the bulleted list (i.e., a feature indented further than the feature(s) listed above it is considered dependent on the feature(s) listed above it).

- further comprising at least partially liquifying at least a portion of the waste plastic in a liquification vessel upstream of the pyrolysis reactor.
  - wherein the liquifying includes heating at least a portion of the waste plastic via indirect heat exchange with at least a portion of the heated aqueous HTM.
  - wherein the heating of step (c) includes heating at least a portion of the waste plastic in the liquification vessel via indirect heat exchange with the heated aqueous HTM.
    - wherein the liquification vessel comprises internal coils through which the heated aqueous HTM flows.
    - wherein the liquification vessel comprises external coils and/or jacketing through with the heated aqueous HTM flows.
    - wherein the heating of step (c) applies heat outside of the liquification vessel.
  - further comprising preheating at least a portion of the waste plastic downstream of the liquification vessel and upstream of the pyrolysis reactor.
  - wherein the liquification vessel comprises an extruder or a CSTR.
- wherein the pyrolysis effluent comprises a pyrolysis oil and a pyrolysis gas.
  - wherein the heating of step (b) includes heating the aqueous HTM with at least a portion of the pyrolysis oil.
  - wherein the heating of step (b) includes heating the aqueous HTM with at least a portion of the pyrolysis gas.
  - wherein the heating of step (b) includes heating the aqueous HTM with at least a portion of the pyrolysis oil and at least a portion of the pyrolysis gas.
- wherein the heated aqueous HTM comprises steam.
- wherein the aqueous HTM is a liquid.
- wherein the aqueous HTM is a vapor.
- wherein the aqueous HTM is steam.
- wherein the heated aqueous HTM comprises a pressure of at least 700, at least 800, at least 900, at least 1,000, at least 1,100, at least 1,200, at least 1,300, at least 1,400, at least 1,500, or at least 1590 psi and/or less than 2,000, less than 1,800, less than 1,700, or less than 1,650 psi.
- wherein the heated aqueous HTM comprises 1,600 psi steam.
- wherein the heated aqueous HTM has a temperature of at least 300, at least 320, at least 340, at least 350, at least 360, at least 370, at least 380, at least 390, or at least 400° C.
- wherein the heated aqueous HTM has a temperature of less than 600, less than 500, less than 450, less than 400, less than 375, or less than 350° C.
- further comprising providing a heat circulation loop comprising the aqueous HTM.
  - wherein the aqueous HTM is at least partially derived from a cracking facility.
  - wherein the heat circulation loop comprises a transfer line exchanger.
  - wherein the heat circulation loop comprises a steam generator.
    - wherein the steam generator forms the HTM.
    - wherein the HTM is generated from boiler feed water from a cracking facility.
- further comprising providing a secondary preheating fluid.
  - wherein the secondary preheating (SPH) fluid comprises air, water, a fuel, a cracking facility processing stream, a pyrolysis facility processing stream, or a combination thereof.
  - further comprising heating at least a portion of the SPH fluid with at least a portion of the pyrolysis effluent to thereby form a heated SPH fluid.
    - further comprising heating at least a portion of the waste plastic upstream of the liquification vessel via indirect heat exchange with the heated SPH fluid.
    - wherein the heated SPH fluid has a temperature of at least 40, at least 50, at least 60, at least 70, at least 80, at least 90, or at least 100° C. and/or less than 250, less than 200, less than 175, less than 150, or less than 125° C.

Additional Claim Supporting Description—Second Embodiment

In a second embodiment of the present technology there is provided a chemical recycling process, the process comprising: (a) providing a first aqueous heat transfer medium (HTM) and a second aqueous HTM; (b) liquifying waste plastic in a liquification vessel to thereby form a liquefied waste plastic, wherein the liquifying includes heating at least a portion of the waste plastic via indirect heat exchange with a heated second aqueous HTM in the liquification vessel and/or upstream of the liquification vessel; (c) heating at least a portion of the liquefied waste plastic downstream of the liquification vessel via indirect heat exchange with a heated first aqueous HTM to thereby provide a heated liquified waste plastic; (d) pyrolyzing at least a portion of the heated liquefied waste plastic in a pyrolysis reactor to thereby form a pyrolysis effluent; (e) heating at least a portion of the first aqueous HTM with a higher temperature portion of the pyrolysis effluent to thereby form the heated first aqueous HTM, wherein the heated first aqueous HTM has a pressure of at least 700 psi; and (f) heating at least a portion of the second aqueous HTM with a lower temperature portion of the pyrolysis effluent to thereby form the heated second aqueous HTM, wherein the heated second aqueous HTM has a pressure of less than 700 psi.

The second embodiment described in the preceding paragraph can also include one or more of the additional aspects/features listed in the following bullet pointed paragraphs. Each of the below additional features of the first embodiment can be standalone features or can be combined with one or more of the other additional features to the extent consistent. Additionally, the following bullet pointed paragraphs can be viewed as dependent claim features having levels of dependency indicated by the degree of indention in the bulleted list (i.e., a feature indented further than the feature(s) listed above it is considered dependent on the feature(s) listed above it).

- wherein the heating of step (e) occurs upstream of the heating of step (f).
- wherein the pyrolysis effluent comprises a pyrolysis oil and a pyrolysis gas.
  - wherein the heating of step (e) and/or the heating of step (f) includes heating the first aqueous HTM and/or the second aqueous HTM with at least a portion of the pyrolysis oil.
  - wherein the heating of step (e) and/or the heating of step (f) includes heating the first aqueous HTM and/or the second aqueous HTM with at least a portion of the pyrolysis gas.

wherein the heating of step (e) and/or the heating of step (f) includes heating the first aqueous HTM and/or the second aqueous HTM with at least a portion of the pyrolysis oil and at least a portion of the pyrolysis gas.

wherein the first aqueous HTM and the second aqueous HTM comprise steam.

wherein the heated second aqueous HTM has a temperature of less than 400, less than 390, less than 380, less than 370, less than 360, less than 350, less than 340, less than 330, less than 320, less than 310, less than 300, or less than 290° C.

wherein the heated second aqueous HTM has a temperature of at least 150, at least 175, at least 200, at least 210, at least 220, at least 230, at least 240, at least 250, at least 260, or at least 270° C.

wherein the heated second aqueous HTM has a pressure of less than 700, less than 600, less than 500, less than 400, less than 300, less than 200, less than 150, less than 100, or less than 50 psi.

wherein the heated second aqueous HTM comprises 30 #steam.

wherein the heated first aqueous HTM has a temperature of at least 300, at least 320, at least 340, at least 350, at least 360, at least 370, at least 380, at least 390, or at least 400° C.

wherein the heated first aqueous HTM has a temperature of less than 600, less than 500, less than 450, less than 400, less than 375, or less than 350° C.

wherein the heated first aqueous HTM comprises a pressure of at least 700, at least 800, at least 900, at least 1,000, at least 1,100, at least 1,200, at least 1,300, at least 1,400, at least 1,500, or at least 1590 psi and/or less than 2,000, less than 1,800, less than 1,700, or less than 1,650 psi.

wherein the heated first aqueous HTM comprises 1,600 psi steam.

further comprising providing a secondary preheating fluid.

wherein the secondary preheating (SPH) fluid comprises air, water, a fuel, a cracking facility processing stream, a pyrolysis facility processing stream, or a combination thereof.

further comprising heating at least a portion of the SPH fluid with at least a portion of the pyrolysis effluent to thereby form a heated SPH fluid.

further comprising heating at least a portion of the waste plastic upstream of the liquification vessel via indirect heat exchange with the heated SPH fluid wherein the heated SPH fluid has a temperature of at least 40, at least 50, at least 60, at least 70, at least 80, at least 90, or at least 100° C. and/or less than 250, less than 200, less than 175, less than 150, or less than 125° C.

Additional Claim Supporting Description—Third Embodiment

In a third embodiment of the present technology there is provided a chemical recycling process, the process comprising: (a) heating a waste plastic in a liquification vessel to thereby form a liquefied waste plastic; (b) pyrolyzing the liquefied waste plastic in a pyrolysis reactor to form a pyrolysis effluent; and (c) supplying heat energy to the waste plastic and/or the liquefied waste plastic via indirect heat exchange with an aqueous HTM, wherein the heat energy supplied by the aqueous HTM is obtained by heat recovery from the pyrolysis effluent.

The third embodiment described in the preceding paragraph can also include one or more of the additional aspects/features listed in the following bullet pointed paragraphs. Each of the below additional features of the first embodiment can be standalone features or can be combined with one or more of the other additional features to the extent consistent. Additionally, the following bullet pointed paragraphs can be viewed as dependent claim features having levels of dependency indicated by the degree of indention in the bulleted list (i.e., a feature indented further than the feature(s) listed above it is considered dependent on the feature(s) listed above it).

wherein liquifying occurs upstream of the pyrolyzing.

wherein the liquifying includes heating at least a portion of the waste plastic in the liquification vessel via indirect heat exchange with a heated aqueous HTM exhibiting a pressure of at least 700 psi.

wherein the liquification vessel comprises internal coils through which the heated HTM flows.

wherein the liquification vessel comprises external coils and/or jacketing through with the heated HTM flows.

wherein the heated aqueous HTM has a temperature of at least 300, at least 320, at least 340, at least 350, at least 360, at least 370, at least 380, at least 390, or at least 400° C.

wherein the heated aqueous HTM has a temperature of less than 600, less than 500, less than 450, less than 400, less than 375, or less than 350° C.

further comprising preheating at least a portion of the liquefied waste plastic downstream of the liquification vessel and upstream of the pyrolysis reactor.

wherein the pyrolysis effluent comprises a pyrolysis oil and a pyrolysis gas.

wherein the supplying includes heating the aqueous HTM with at least a portion of the pyrolysis oil.

wherein the supplying includes heating the aqueous HTM with at least a portion of the pyrolysis gas.

wherein the supplying includes heating the aqueous HTM with at least a portion of the pyrolysis oil and at least a portion of the pyrolysis gas.

wherein the aqueous HTM comprises a vapor.

wherein the heated aqueous HTM comprises a pressure of at least 700, at least 800, at least 900, at least 1,000, at least 1,100, at least 1,200, at least 1,300, at least 1,400, at least 1,500, or at least 1590 psi and/or less than 2,000, less than 1,800, less than 1,700, or less than 1,650 psi.

wherein the heated aqueous HTM comprises 1,600 psi steam.

wherein the heated aqueous HTM has a temperature of at least 300, at least 320, at least 340, at least 350, at least 360, at least 370, at least 380, at least 390, or at least 400° C.

wherein the heated aqueous HTM has a temperature of less than 600, less than 500, less than 450, less than 400, less than 375, or less than 350° C.

Claims Not Limited to Disclosed Embodiments

When a numerical sequence is indicated, it is to be understood that each number is modified the same as the first number or last number in the numerical sequence or in the sentence, e.g., each number is "at least," or "up to" or "not more than" as the case may be; and each number is in an "or" relationship. For example, "at least 10, 20, 30, 40, 50, 75 wt.

% . . . " means the same as "at least 10 wt. %, or at least 20 wt. %, or at least 30 wt. %, or at least 40 wt. %, or at least 50 wt. %, or at least 75 wt. %," etc.; and "not more than 90 wt. %, 85, 70, 60 . . . " means the same as "not more than 90 wt. %, or not more than 85 wt. %, or not more than 70 wt. % . . . " etc.; and "at least 1%, 2%, 3%, 4%, 5%, 6%, 7%, 8%, 9% or 10% by weight . . . " means the same as "at least 1 wt. %, or at least 2 wt. %, or at least 3 wt. % . . . " etc.; and "at least 5, 10, 15, 20 and/or not more than 99, 95, 90 weight percent" means the same as "at least 5 wt. %, or at least 10 wt. %, or at least 15 wt. % or at least 20 wt. % and/or not more than 99 wt. %, or not more than 95 wt. %, or not more than 90 weight percent . . . " etc.

The preferred forms of the invention described above are to be used as illustration only and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A pyrolysis process comprising:
(a) pyrolyzing waste plastic at a temperature of 650° C. to 1,100° C. in a pyrolysis reactor to thereby provide a pyrolysis effluent;
(b) heating an aqueous heat transfer medium (HTM) in a heat transfer medium loop via indirect heat exchange with at least a portion of the pyrolysis effluent to thereby provide a heated aqueous HTM exhibiting a pressure of at least 700 psi; and
(c) heating at least a portion of the waste plastic upstream of the pyrolysis reactor with at least a portion of the heated aqueous HTM via indirect heat exchange, wherein the aqueous heat transfer medium (HTM) is not mixed with the pyrolysis effluent or the waste plastic.

2. The process according to claim 1, further comprising at least partially liquifying at least a portion of the waste plastic in a liquification vessel upstream of the pyrolysis reactor, wherein the liquifying includes heating at least a portion of the waste plastic via indirect heat exchange with at least a portion of the heated aqueous HTM.

3. The process according to claim 1, wherein the pyrolysis effluent comprises a pyrolysis oil and a pyrolysis gas, wherein the heating of step (b) includes heating the aqueous HTM with at least a portion of the pyrolysis gas.

4. The process according to claim 1, wherein the aqueous HTM is steam.

5. The process according to claim 1, wherein the heated aqueous HTM exhibits a pressure of at least 1,400 and less than 2,000 psi.

6. The process according to claim 1, wherein the heated aqueous HTM has a temperature of at least 300° C.

7. The process according to claim 1, further comprising:
(i) providing a secondary preheating (SPH) fluid,
(ii) heating at least a portion of the SPH fluid with at least a portion of the pyrolysis effluent to thereby form a heated SPH fluid, and
(iii) further comprising heating at least a portion of the waste plastic upstream of the pyrolysis reactor via indirect heat exchange with the heated SPH fluid.

8. A pyrolysis process comprising:
(a) providing a first aqueous heat transfer medium (HTM) in a first heat transfer medium (HTM) loop and a second aqueous HTM in a second heat transfer medium (HTM) loop;
(b) liquifying waste plastic in a liquification vessel to thereby form a liquefied waste plastic, wherein the liquifying includes heating at least a portion of the waste plastic via indirect heat exchange with a heated second aqueous HTM in the liquification vessel and/or upstream of the liquification vessel, wherein the second aqueous heat transfer medium (HTM) is not mixed with the at least portion of the waste plastic;
(c) heating at least a portion of the liquefied waste plastic downstream of the liquification vessel via indirect heat exchange with a heated first aqueous HTM to thereby provide a heated liquified waste plastic;
(d) pyrolyzing at a temperature of 650° C. to 1,100° C. at least a portion of the heated liquefied waste plastic in a pyrolysis reactor to thereby form a pyrolysis effluent;
(e) heating at least a portion of the first aqueous HTM with a higher temperature portion of the pyrolysis effluent to thereby form the heated first aqueous HTM, wherein the heated first aqueous HTM has a pressure of at least 700 psi; and
(f) heating at least a portion of the second aqueous HTM with a lower temperature portion of the pyrolysis effluent to thereby form the heated second aqueous HTM, wherein the heated second aqueous HTM has a pressure of less than 700 psi.

9. The process according to claim 8, wherein the pyrolysis effluent comprises a pyrolysis oil and a pyrolysis gas, wherein the heating of step (e) and/or the heating of step (f) includes heating the first aqueous HTM and/or the second aqueous HTM with at least a portion of the pyrolysis gas.

10. The process according to claim 8, wherein the first aqueous HTM and the second aqueous HTM comprise steam.

11. The process according to claim 10, wherein the heated first aqueous HTM exhibits a pressure of at least 1,400 and less than 2,000 psi.

12. The process according to claim 11, wherein the heated second aqueous HTM comprises a pressure of less than 300 psi.

13. The process according to claim 8, wherein the heated first aqueous HTM and the heated second aqueous HTM have a temperature of at least 300° C.

14. The process according to claim 8, further comprising:
(i) providing a secondary preheating (SPH) fluid,
(ii) heating at least a portion of the SPH fluid with at least a portion of the pyrolysis effluent to thereby form a heated SPH fluid, and
(iii) further comprising heating at least a portion of the waste plastic upstream of the pyrolysis reactor via indirect heat exchange with the heated SPH fluid.

15. A pyrolysis process comprising:
(a) heating a waste plastic in a liquification vessel to thereby form a liquefied waste plastic;
(b) pyrolyzing at a temperature of 650° C. to 1,100° C. the liquefied waste plastic in a pyrolysis reactor to form a pyrolysis effluent; and
(c) supplying heat energy to the waste plastic and/or the liquefied waste plastic via indirect heat exchange with an aqueous heat transfer medium (HTM) in a heat transfer medium loop wherein the heat energy supplied by the aqueous HTM is obtained by heat recovery from the pyrolysis effluent.

16. The process according to claim 15, further comprising at least partially liquifying at least a portion of the waste plastic in a liquification vessel upstream of the pyrolysis reactor, wherein the liquifying includes heating at least a portion of the waste plastic via indirect heat exchange with at least a portion of the heat energy.

17. The process according to claim 15, wherein the aqueous HTM is steam.

18. The process according to claim 17, wherein the aqueous HTM exhibits a pressure of at least 1,400 and less than 2,000 psi.

19. The process according to claim 1, further comprising providing a second aqueous HTM, wherein the second aqueous HTM also derives heat energy from the pyrolysis effluent.

20. The process according to claim 1, further comprising:

(i) providing a secondary preheating (SPH) fluid, (ii) heating at least a portion of the SPH fluid with at least a portion of the pyrolysis effluent to thereby form a heated SPH fluid, and (iii) further comprising heating at least a portion of the waste plastic upstream of the pyrolysis reactor via indirect heat exchange with the heated SPH fluid.

* * * * *